(12) United States Patent
Shetty et al.

(10) Patent No.: US 8,576,737 B1
(45) Date of Patent: Nov. 5, 2013

(54) INTELLIGENT SPECIFICATION OF FORWARD-LINK RATE-CONTROL

(75) Inventors: Manoj Shetty, Overland Park, KS (US);
Sachin R. Vargantwar, Overland Park, KS (US); Maulik Shah, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 284 days.

(21) Appl. No.: 13/010,093

(22) Filed: Jan. 20, 2011

(51) Int. Cl.
*G06F 11/00* (2006.01)

(52) U.S. Cl.
USPC .......... 370/252; 709/223; 709/224; 709/225; 709/226

(58) Field of Classification Search
USPC ........................................................ 370/252
See application file for complete search history.

(56) References Cited

U.S. PATENT DOCUMENTS

| | | | |
|---|---|---|---|
| 6,930,981 B2 * | 8/2005 | Gopalakrishnan et al. | 370/252 |
| 8,259,600 B1 * | 9/2012 | Dinan et al. | 370/252 |
| 8,295,235 B2 * | 10/2012 | Varma et al. | 370/329 |
| 8,320,263 B2 * | 11/2012 | Kurose et al. | 370/252 |
| 2004/0151122 A1 * | 8/2004 | Lau et al. | 370/252 |
| 2005/0059417 A1 * | 3/2005 | Zhang et al. | 455/515 |
| 2008/0279093 A1 * | 11/2008 | Hassan et al. | 370/216 |
| 2011/0128867 A1 * | 6/2011 | Tian et al. | 370/252 |

* cited by examiner

*Primary Examiner* — Charles C Jiang
*Assistant Examiner* — Deepa Belur

(57) ABSTRACT

A method and system is disclosed for dynamic adjustment of forward-link rate-control parameters. An access terminal in a wireless communication system that includes a base station will determine a requested forward-link data rate by measuring a signal-to-noise ratio (SNR) of the forward link, and looking up a corresponding forward-link data rate in one of three different tabulations of SNR threshold values against forward-link data rates. The AT will operate in a first state in which the access terminal uses a single tabulation for both increasing and decreasing measurements of SNR, and upon receiving a message from the base station indicating high time slot utilization on the forward link, the AT will transition to operating in a second state in which the access terminal uses a dual tabulation, wherein one of the dual tabulations is used for increasing measurement of SNR, and the other is used for decreasing measures of SNR.

25 Claims, 11 Drawing Sheets

| SINR INCREASE AND DECREASE TABLE 602 | |
|---|---|
| SINR UPPER LIMIT (dB) | DRC CODE |
| −10.4 | 0 |
| −7.6 | 1 |
| −4.6 | 2 |
| −2.8 | 3 |
| −1.5 | 4 |
| 0.5 | 5 |
| 1.6 | 6 |
| 3.4 | 7 |
| 4.8 | 8 |
| 5.9 | 9 |
| 8.1 | 10 |
| 10.4 | 11 |
| 11.8 | 12 |

| SINR INCREASE TABLE 604 | |
|---|---|
| SINR UPPER LIMIT (dB) | DRC CODE |
| −10.4 | 0 |
| −8.0 | 1 |
| −6.5 | 2 |
| −3.5 | 3 |
| −2.5 | 4 |
| 0.0 | 5 |
| 1.0 | 6 |
| 2.5 | 7 |
| 3.5 | 8 |
| 5.0 | 9 |
| 7.0 | 10 |
| 9.0 | 11 |
| 10.5 | 12 |

| SINR DECREASE TABLE 606 | |
|---|---|
| SINR UPPER LIMIT (dB) | DRC CODE |
| −10.4 | 0 |
| −8.5 | 1 |
| −7.0 | 2 |
| −4.0 | 3 |
| −3.0 | 4 |
| −0.5 | 5 |
| 0.5 | 6 |
| 2.0 | 7 |
| 3.0 | 8 |
| 4.5 | 9 |
| 6.5 | 10 |
| 8.5 | 11 |
| 10.0 | 12 |

FIG. 6

INTELLIGENT SPECIFICATION OF FORWARD-LINK RATE-CONTROL

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An AT receives data from a base station (or sector or a BTS) on a "forward link" and sends data to the base station on a "reverse link." Data on either link are encoded and transmitted by the sender and received and decoded by the receiver. The rate at which a given amount of data is transmitted (i.e., the "data rate") is governed largely by the scheme used to encode the data. The data rate that can be reliably achieved on a link depends on the ability of the receiver to successfully decode the received encoded data, which in turn depends, at least in part, on the RF conditions between the transmitting and receiving entities on that link.

RF conditions are typically measured as some form of signal-to-noise ratio ("SNR"). Generally, the higher the SNR, the higher the achievable data rate, and vice versa. The signal power level (the numerator in the SNR) measured by a receiving entity (e.g., the AT for the forward link) depends on the transmission power level of the transmitting entity and on the distance between the transmitting and receiving entities, among other possible factors. The noise (the denominator in the SNR) depends on other transmitting sources, such as neighboring base stations, and reflections of signals off buildings and other structures, for example. By adjusting the encoding scheme according to the SNR at any given time, the data transmission rate can thus be optimized for the prevailing RF conditions.

In particular, under IS-856 an access terminal periodically measures the SNR of its forward link from the base station, and then informs the base station of a requested data rate determined based on the measured SNR. The base station then uses an encoding scheme that achieves the requested data rate. In practice, the AT selects one of a list of predetermined data rates based on the measured SNR, and the base station uses a corresponding, predetermined encoding scheme based on the data rate selected by the AT and communicated in a request message to the base station. The AT makes its selection by comparing the measured SNR with a set of preconfigured threshold SNR values, each corresponding to one of the predetermined data rates. In conventional operation, the threshold SNR values are fixed parameters of the wireless communication system.

The rate at which a base station can transmit data to each of one or more access terminals it is serving also affects how much data may be queued up at any given time, awaiting transmission. Again under IS-856, user data bound for access terminals are encoded into packets that are transmitted during periodically-repeating, forward-link time slots of equal durations. Every time-slot transmission contains a portion dedicated to system and/or control data, and a portion available for encoded packet data. Since the base station does not necessarily have user data to transmit during every time slot, some time-slot transmissions may be empty or "idle" with respect to user data packets. The ratio of the number of non-idle time slots during a given time window to the total number of all time slots (idle and non-idle) during the given window is commonly referred to the time-slot utilization, and is a number in the range [0, 1]. The higher the data rate for a given transmission, the more "densely" packed the corresponding packets, and hence the fewer the number of time slots required for the transmission. Thus, for a given amount of data arriving at a base station for transmission to access terminals, the higher the transmission data rate, in general, the lower the time-slot utilization, and vice versa. High time-slot utilization can lead to an increase in the amount of data queued and awaiting transmission, and a resultant increase in transmission delay and corresponding degradation of overall performance.

It may happen that at a time when time-slot utilization is high, one or more access terminals are measuring a respective SNR value just below a threshold SNR value that would enable them to request a higher forward-link data rate than strictly permitted by the measured value. If, in this situation, the SNR thresholds for those one or more access terminals could be relaxed so that they request higher data rates, a resultant reduction in the required number of forward-link time slots could help lower the high time-slot utilization, and thus help reduce transmission delays. However, in conventional operation the SNR threshold values are fixed system parameters that cannot be dynamically adjusted. It would therefore be advantageous to enable dynamic adjustment of forward-link rate control parameters under conditions which could benefit from some form of relaxed thresholds.

Hence in one respect, various embodiments of the present invention provide, in an access terminal configured to operate in a wireless communication system that includes a base station, a method comprising: determining an initial forward-link data rate based on an initial signal-to-noise ratio (SNR) measurement of a forward link from the base station, the initial SNR measurement having been made by the access terminal at an initial time; subsequent to the initial time, determining an updated SNR measurement of the forward link from the base station; upon determining that the updated SNR measurement is greater than the initial SNR measurement, making a determination of a first updated forward-link data rate based on a first tabulation of SNR threshold values against corresponding forward-link data-rate values, and transmitting a request to the base station to receive data on the forward link at the determined first updated forward-link data rate; and upon determining that the updated SNR measurement is less than the initial SNR measurement, making a determination of a second updated forward-link data rate based on a second tabulation of SNR threshold values against corresponding forward-link data-rate values, and transmitting a request to the base station to receive data on the forward link at the determined second updated forward-link data rate, wherein the first and second tabulations are different.

In another respect, various embodiments of the present invention provide, in an access terminal configured to operate in a wireless communication system that includes a base station, a method comprising: operating in a first state in which at least: the access terminal requests a forward-link data rate from the base station by (i) measuring a signal-to-noise ratio (SNR) of a forward link from the base station, (ii) determining a first-state forward-link data rate by correlating the measured SNR with a forward-link data-rate value in a single tabulation of SNR threshold values against corresponding forward-link data-rate values, regardless of whether the measured SNR is greater than or less than a previously-measured SNR of the forward link, and (iii) transmitting a request to the base station to receive data on the forward link at the determined first-state forward-link data rate; while operating in the first state, receiving a high slot-utilization message from the base station; and in response to receiving the high slot-utilization message, transitioning to operating in a second state in which at least: the access terminal requests a forward-link data rate from the base station by (i) measuring the SNR of the forward link from the base station, (ii) if the measured SNR is greater than the previously-measured SNR of the forward link, determining an SNR-up forward-link data rate based on a first tabulation of SNR threshold values against corresponding forward-link data-rate values, and transmitting a request to the base station to receive data on the forward link at the determined SNR-up forward-link data rate, and (iii) if the measured SNR is less than the previously-measured SNR, determining an SNR-down forward-link data rate based on a second tabulation of SNR threshold values against corresponding forward-link data-rate values, and transmitting a request to the base station to receive data on the forward link at the determined SNR-down forward-link data rate, wherein the first and second tabulations are different.

In still another respect, various embodiments of the present invention provide, in a base station configured to operate as part of a wireless communication system, a method comprising: at the base station, making a first determination that greater than a threshold number of data packets are to be transmitted during upcoming forward-link time slots to one or more access terminals engaged in respective active communication sessions with the base station; and in response to the first determination, transmitting to the one or more access terminals a high slot-utilization message instructing each respective access terminal of the one or more access terminals to determine respective requested forward-link data rates based on (i) a first tabulation of forward-link Signal-to-Noise (SNR) threshold values against corresponding forward-link data-rate values if the respective access terminal detects increasing SNR of the forward link, and (ii) a second tabulation of forward-link SNR threshold values against corresponding forward-link data-rate values if the respective access terminal detects decreasing SNR of the forward link, wherein the first and second tabulations are different.

In yet another respect, various embodiments of the present invention provide an access terminal configured to operate in a wireless communication system that includes a base station, the access terminal comprising: means for determining an initial forward-link data rate based on an initial signal-to-noise ratio (SNR) measurement of a forward link from the base station, wherein the initial SNR measurement is made by the access terminal at an initial time; means for determining an updated SNR measurement of the forward link from the base station subsequent to the initial time; means for responding to determining that the updated SNR measurement is greater than the initial SNR measurement by making a determination of a first updated forward-link data rate based on a first tabulation of SNR threshold values against corresponding forward-link data-rate values, and transmitting a request to the base station to receive data on the forward link at the determined first updated forward-link data rate; and means for responding to determining that the updated SNR measurement is less than the initial SNR measurement by making a determination of a second updated forward-link data rate based on a second tabulation of SNR threshold values against corresponding forward-link data-rate values, and transmitting a request to the base station to receive data on the forward link at the determined second updated forward-link data rate, wherein the first and second tabulations are different.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 6 illustrates example tables of forward-link rate-control parameters that can be used in an example embodiment of dynamic adjustment of forward-link rate-control parameters.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1×-RTT" communications, also abbreviated as just "1×." However, since IS-2000 supports both circuit voice and packet data communications, the term 1× (or 1×-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1×-RTT may be similarly distinguished. Absent any specific version identification, EVDO will generally refer to any version of IS-856, and vice versa. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
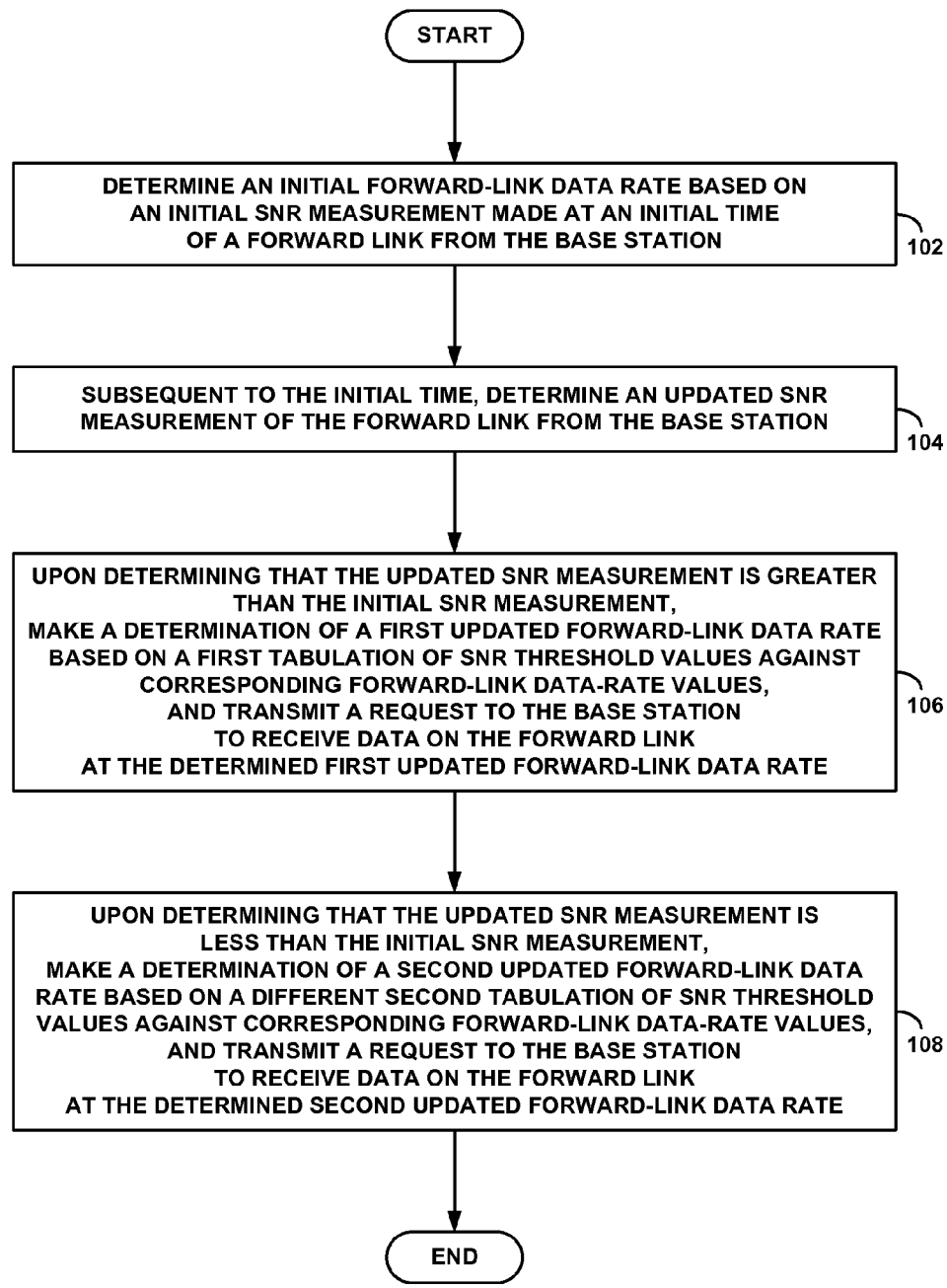
FIG. 1 is a flowchart illustrating an example embodiment of dynamic adjustment of forward-link rate-control parameters.

FIG. 1 is a flowchart illustrating an example embodiment of dynamic adjustment of forward-link rate-control parameters. By way of example, the steps of the flowchart could be implemented in an access terminal configured to operate according to a CDMA family of protocols, including IS-856, in a similarly-compliant wireless communication system that includes a base station (among other elements of a RAN). A base station typically comprises a BSC, a BTS, and a coverage area, such as a cell or a sector. The BSC may control more than one BTS, and the BTS may radiate (and receive) in more than one sector.

At step 102, the access terminal determines an initial forward-link data rate based on an initial signal-to-noise ratio (SNR) measurement of a forward link from the base station. The initial SNR measurement will have been made by the access terminal at an initial time that is no later than the time at which the initial forward-link data rate is determined. That is, the access terminal's initial SNR measurement precedes the determination of the initial forward-link data rate.

At step 104, subsequent to the initial time, the access terminal determines an updated SNR measurement of the forward link from the base station. By way of example, the access terminal may make periodic measurements of the SNR of the forward link, whereby the updated measurement of step 104 is the next periodic measurement after the initial measurement. The next actions of the access terminal depend on the relative sizes of the initial and updated SNR measurements.

At step 106, upon determining that the updated SNR measurement is greater than the initial SNR measurement, the access terminal makes a determination of a first updated forward-link data rate based on a first tabulation of SNR threshold values against corresponding forward-link data-rate values. The access terminal then transmits a request to the base station to receive data on the forward link at the determined first updated forward-link data rate.

In an alternative action at a final step 108, upon determining that the updated SNR measurement is less than the initial SNR measurement, the access terminal makes a determination of a second updated forward-link data rate based on a different, second tabulation of SNR threshold values against corresponding forward-link data-rate values. The access terminal then transmits a request to the base station to receive data on the forward link at the determined second updated forward-link data rate.

Although not explicitly illustrated in FIG. 1, the access terminal could determine that the updated SNR measurement is equal to the initial SNR measurement. In this case, the access terminal will transmit a request to the base station to receive data on the forward link at the initial forward-link data rate. This could be accomplished as an additional step, or incorporated in either of steps 106 or 108 by expanding one or the other of these steps to include the condition of equality of the updated and initial SNR measurements, and a corresponding transmission of the initial forward-link data rate.

In further accordance with the example embodiment, in making the determination of the first updated forward-link data rate, the access terminal will replace the initial SNR measurement with the updated SNR measurement once the comparison of the initial and updated SNR measurements has been made. If the updated SNR measurement is greater than the initial SNR measurement so that the access terminal makes the determination of the first updated forward-link data rate, the access terminal will also replace the initial forward-link data rate with the determined first updated forward-link data rate. The result of this operation is that the updated SNR measurement becomes the new initial SNR measurement for the next periodic SNR measurement and comparison made by the access terminal; and the next periodic SNR measurement becomes the next subsequent updated SNR measurement. Thus, the procedure of measuring an updated SNR measurement and comparing it to the initial SNR measurement is a periodically repeating operation. Similarly, the first updated forward-link data rate becomes the new initial forward-link data rate for the next iteration of the procedure.

In a likewise manner, in making the determination of the second updated forward-link data rate, the access terminal will again replace the initial SNR measurement with the updated SNR measurement once the comparison of the initial and updated SNR measurements has been made. In this case, if the updated SNR measurement is less than the initial SNR measurement so that the access terminal makes the determination of the second updated forward-link data rate, the access terminal will also replace the initial forward-link data rate with the determined second updated forward-link data rate. Once more, the result of this operation is that the updated SNR measurement becomes the new initial SNR measurement for the next periodic SNR measurement and comparison made by the access terminal; and the next periodic SNR measurement again becomes the next subsequent updated SNR measurement. Thus, the periodically repeating operation applies to either outcome of the comparison of updated and initial SNR measurements, the only difference being whether a determination of a first or second updated forward-link data rate is made. In the latter instance, the second updated forward-link data rate becomes the new initial forward-link data rate for the next iteration of the procedure. Note that the periodically repeating operation also accommodates the case in which the updated SNR measurement equals the initial SNR measurement.

By employing two different tabulations of SNR threshold values against corresponding forward-link data-rate values— one tabulation for an updated SNR measurement that is greater than the initial SNR measurement, and the other for an updated SNR measurement that is less than the initial SNR measurement—the access terminal can invoke two different patterns of increasing and decreasing forward-link data rates in response to increasing and decreasing measures of SNR on the forward link. With just the conventional, single tabulation of SNR threshold values against corresponding forward-link data-rate values, each given SNR threshold value is applied to both increasing and decreasing measures of SNR on the forward link to determine a corresponding forward-link data rate. The result is that the functional path of increasing data rate for increasing SNR measure is just the reverse of the functional path of decreasing data rate for decreasing SNR measure. In contrast, the two different tabulations of the example embodiment introduce a sort of hysteresis effect with respect to increasing and decreasing measures of SNR, resulting in different functional paths of increasing and decreasing data rates.

More particularly, the method of the example embodiment is aimed at helping alleviate transmission scheduling delay of user data at the base station by enabling access terminals to more aggressively request higher forward-link data rates for increasing SNR measurements than under conventional operation, and at the same time less aggressively request lower forward-link data rates for decreasing SNR measurements than under conventional operation. In doing so, the aggregate of forward links from the base station to access terminals with active communications can be made to function at a higher average data rate than under conventional operation, thereby helping the base station keep up with AT-bound user data arriving from the network.

The use of the two different tabulations provides a basis for this advantageous higher average forward-link data rate. As described briefly below, and explained with specific numerical examples later, the two different tabulations establish two different but overlapping sets of ranges of SNR values. Within each range, a particular data rate applies. In each set, adjacent ranges are separated by a threshold SNR value, so that crossing a particular threshold value corresponds to leaving one range and entering an adjacent one. It will be appreciated that, in general, the logic of a threshold-comparison test can be variously defined with respect to how equality or inequality (i.e., greater than or less than) with a threshold value controls a resultant decision, and that equivalent results can be achieved using alternative definitions with respect to equality and inequality with a threshold value, in conjunction with alternative versions of the logic.

In accordance with the example embodiment, the first tabulation includes a first list of first SNR threshold values and a corresponding list of forward-link data-rate values. Each of the first SNR threshold values in the first list is mutually associated with a respective one of the forward-link data-rate values in the corresponding list. The second tabulation includes a second list of second SNR threshold values and the same corresponding list of forward-link data-rate values. As with the first tabulation, each of the second SNR threshold values in the second list is mutually associated with a respective one of the forward-link data-rate values in the corresponding list. Hence, each first SNR threshold value in the first list is associated with a second SNR threshold value in the second list by way of the same mutually associated forward-link data-rate value in the corresponding list. In further accordance with the example embodiment, each first SNR threshold value in the first list is greater than the associated second SNR threshold value in the second list.

With the first and second tabulations configured as described, the access terminal makes the determination of the first updated forward-link data rate is made as follows. It determines the smallest first SNR threshold value in the first list that is greater than the updated SNR measurement, and then determines the respective forward-link data-rate value mutually associated with the determined smallest first SNR threshold value. If the mutually associated forward-link data-rate value is not less than the initial forward-link data rate, the access terminal sets the first updated forward-link data rate to the respective mutually associated forward-link data-rate value. If instead the mutually associated forward-link data-rate value is less than the initial forward-link data rate, the access terminal sets the first updated forward-link data rate to the initial forward-link data rate.

The access terminal follows a similar procedure to make the determination of the second updated forward-link data rate. Specifically, the access terminal determines the smallest second SNR threshold value in the second list that is greater than the updated SNR measurement, and then determines the respective forward-link data-rate value mutually associated with the determined smallest second SNR threshold value. If this mutually associated forward-link data-rate value is not greater than the initial forward-link data rate, the access terminal sets the second updated forward-link data rate to this respective mutually associated forward-link data-rate value. If instead this mutually associated forward-link data-rate value is greater than the initial forward-link data rate, the access terminal sets the second updated forward-link data rate to the initial forward-link data rate.

In accordance with the example embodiment being implemented in an access terminal configured to operate according to a CDMA family of protocols, including IS-856, the request to the base station to receive data at the determined first updated forward-link data rate will be a Data Rate Control (DRC) message containing an indication of the determined first updated forward-link data rate. In practice, the indication of the determined first updated forward-link data rate will take the form of an encoded value associated with the requested data rate. Similarly, the request to the base station to receive data at the determined second updated forward-link data rate will be a DRC message containing an indication of the determined second updated forward-link data rate. Again, the indication of the determined second updated forward-link data rate will take the form of an encoded value associated with the requested data rate.

Also in accordance with the example embodiment being implemented in an access terminal configured to operate according to a CDMA family of protocols, including IS-856, the initial and updated SNR measurements of the forward link from the base station are both measurements by the access terminal of Signal to Interference plus Noise (SINR) of the forward link from the base station. In addition, both the first list of first SNR threshold values and the second list of second SNR threshold values are, respectively, first and second lists of SINR threshold values. More specifically, under IS-856 each sector periodically broadcasts a pilot signal at full power on a respective forward-link pilot channel. Pilot channel broadcasts are synchronized among all sectors, and no other data or signals other than each sector's pilot signal is carried during the broadcasts. The access terminal computes SINR for a given sector (or base station) as the ratio of the given sector's pilot signal power level to the sum of all the other pilot signals plus noise that the access terminal detects during the broadcast.

As described above, the access terminal will use the two different tabulations as a way to help alleviate transmission scheduling delay of user data at the base station. Accordingly, the access terminal will not necessarily always use the two different tabulations to determine requested forward-link data rates, but will do so when conditions at the base station warrant the dual-tabulation determinations. Correspondingly, when conditions do not warrant dual-tabulation determinations of requested forward-link data rates, the access terminal will instead operate conventionally, using a single tabulation of SNR threshold values against corresponding forward-link data-rate values for both increasing and decreasing measurements of SNR.

More specifically, as a further aspect of the example embodiment, the access terminal will operate in one of two states with respect to determination of requested forward-link data rates. In a first state, the access terminal will operate conventionally, using the single tabulation; in a second state, the access terminal will employ the dual-tabulation determination in accordance with the description in the preceding paragraphs (and as further explained by way of example below). The access terminal will make transitions between the first state and the second state in response to determining conditions that warrant the transitions.

In particular, the access terminal will transition from operating in the first state to operating in the second state in response to receiving an indication that the base station has a backlog (or a building backlog) of data to transmit. For instance, for a base station that employs time division multiplexing (TDM) on its forward links to transmit user data in data packets during periodically repeating time slots (e.g., a base station operating under IS-856), the backlog condition could correspond to heavily subscribed or oversubscribed time slots. Accordingly, the base station could transmit a "high slot-utilization message" to indicate the that the average data rate of the aggregate forward links from the base station is not sufficient to keep up with the volume of user data that the base station needs to transmit, or that the base station has more than a threshold volume of data to transmit.

Although not explicitly described in the steps of FIG. 1, the access terminal will thus respond to receiving a high slot-utilization message from the base station while operating in the first state by transitioning to operating in the second state. If the backlog condition thereafter abates and/or the volume of user data to be transmitted by the base station on forward links drops below the threshold, the base station will broadcast a "low slot-utilization message" indicating the change in condition. In further accordance with the example embodiment, the access terminal will transition back to operating in the first state upon receiving a low slot-utilization message.

The advantageous operation of the access terminal more aggressively requesting increased forward-link data rates for increasing SNR and less aggressively requesting decreased forward-link data rates for decreasing SNR needs to be applied judiciously so as to not result in forward-link data rates that cannot be reliably sustained. The matching of SNR threshold values and forward-link data rates in the single, conventional tabulation (i.e., used in the first state) is established based on a combination of theoretical principles, simulations, and empirical data, and incorporates (at least implicitly) a data-rate envelope above the particular forward-link data rate associated each given SNR threshold value. Consequently, the dual-tabulation method of the example embodiment (and, e.g., of the second state) could operate within the data-rate envelope. This may be achieved both through careful configuration of the values of the first and second tabulations, and by the access terminal monitoring the quality of data transmissions received on its forward link from the base station.

In connection with monitoring the quality of received transmissions, the access terminal will monitor a packet error rate (PER) of data packets received from the base station. It will be appreciated that the PER can be measured within a given time window as a ratio of the number of packets received with unrecoverable errors to the total number of packets received. Under IS-856, a packet received with unrecoverable errors corresponds to a received transmission that the access terminal could not successfully decode into a data packet. Other measures of PER could be defined as well. In further accordance with the example embodiment, an access terminal that, while operating in the second state, measures a PER above a threshold PER will transition to operating in the first state. For example, the PER threshold could be 0.01 (1%). By doing so, the access terminal will ensure that the advantageous dual-tabulation operation does not adversely impact the quality of forward-link communications from the base station.

Although not explicitly described in the steps of FIG. 1, the base station plays a role by determining if and when to transmit a high or low slot-utilization message. As noted, the base station transmits a high slot-utilization message when it determines that a backlog condition exists. For example, if the base station has greater than a threshold number of packets to transmit, this could trigger a backlog condition. Other definitions of the backlog condition could be devised as well. Similarly, the base station transmits a low slot-utilization message when it determines that a backlog condition abates (or ceases to exist). Again by way of example, if the number of packets to be transmitted by base station drops below a threshold number of packets to transmit, this could signal abatement of the backlog condition.

Note that the characterization of the first state in terms of the access terminal operating conventionally by using the single tabulation should not be viewed as limiting the first state to only the described behavior of that state. The first state could include other behaviors as well, provided those other behaviors don't contradict or are not mutually exclusive with the explicitly-described behavior of the first state. Similarly, the characterization of the second state in terms of the access terminal employing the dual-tabulation determination of requested forward-link data rates should not be viewed as limiting the second state to only the described behavior of that state. As with the first state, the second state could include other behaviors as well, provided those other behaviors don't contradict or are not mutually exclusive with the explicitly-described behavior of the second state.

In the discussion of FIG. 1, as well as in other discussions and explanations herein, the terms "first" and "second" as applied to "states," "determinations," "conditions," and the like, are used as identifying labels, and not meant to imply any numerical ordering (although a numerical ordering is not necessarily excluded).

It will also be appreciated that the steps of FIG. 1 are shown by way of example, and that additional and/or alternative steps or alternative ordering of steps could be carried out and still remain within the scope and spirit of the present invention.

Figure 2:
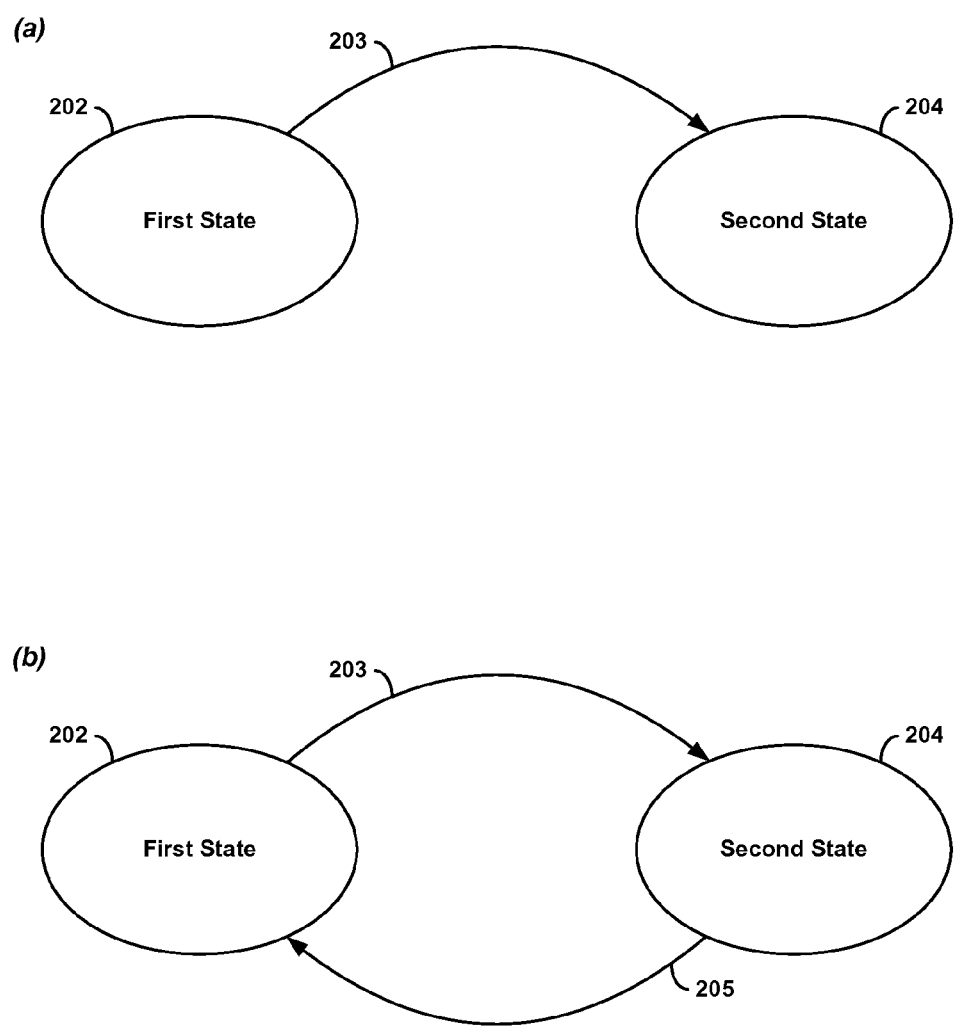
FIG. 2 is a state diagram illustrating an example embodiment of dynamic adjustment of forward-link rate-control parameters.

The example embodiment in terms of operation of the access terminal in one of two states is illustrated in FIG. 2. In panel (a) at the top, an access terminal is operating in the first state 202, wherein operation in the first state could be characterized by use of the conventional, single tabulation to determine requested forward-link data rates, as described above. Upon receiving a high slot-utilization message from the base station, the access terminal makes a transition 203 to the second state 204. As described above, the high slot-utilization message is an indication that a backlog condition exists at the base station. Operation in the second state is characterized by employment of the dual-tabulation determination of requested forward-link data rates, also as described above. The bottom panel (b) of FIG. 2 again includes the first state 202, the second state 204, and transition 203 from the first to the second state, but also includes a transition 205 from the second back to the first state. In accordance with the example embodiment discussed above, the transition 205 back to the first state could comprise either or both of the AT measuring a packet error rate above a threshold rate, or the AT receiving a low slot-utilization message from the base station.

Figure 3:
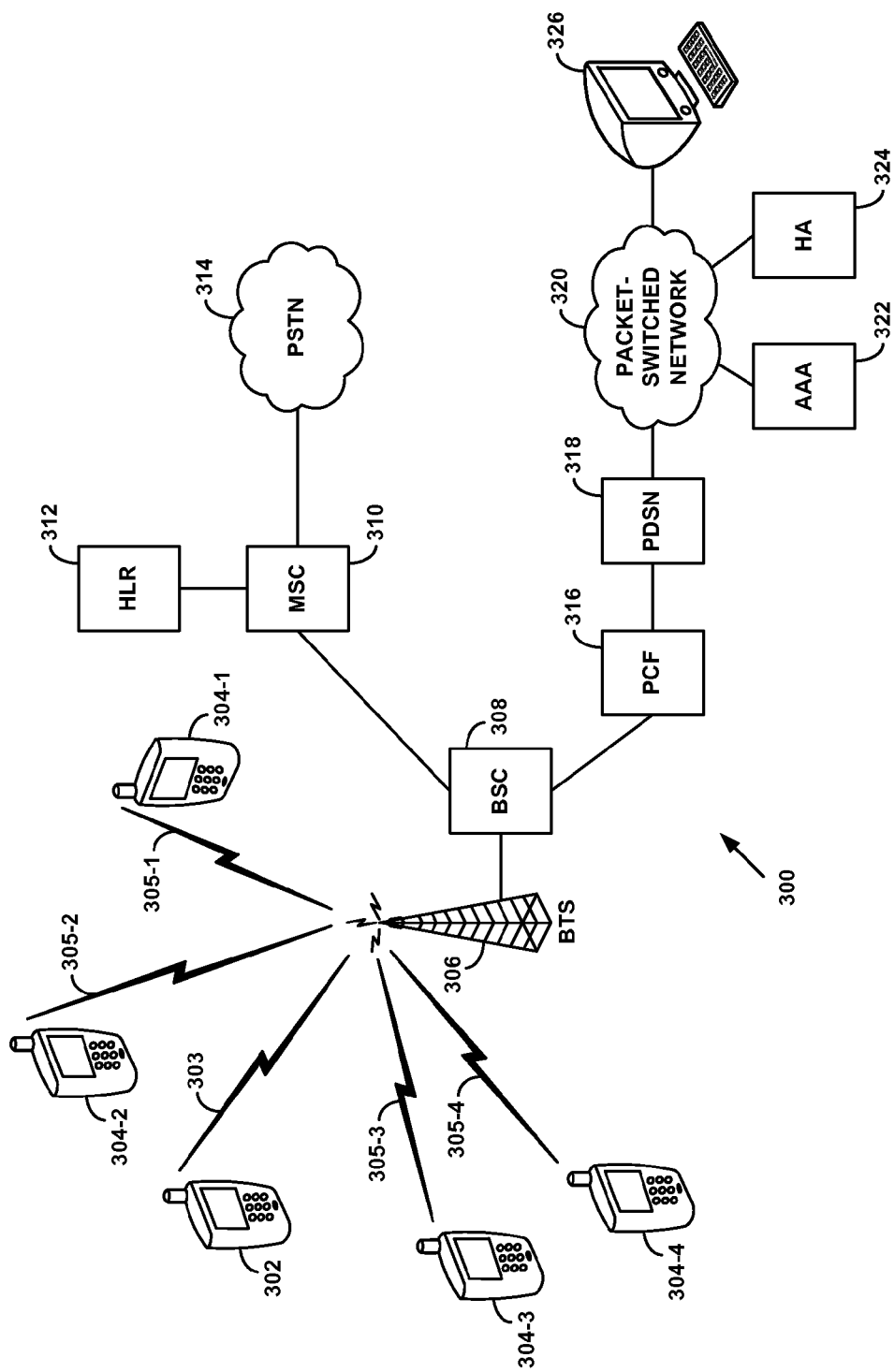
FIG. 3 is a simplified block diagram of a wireless communication system in which an example embodiment of dynamic adjustment of forward-link rate-control parameters can be employed.

FIG. 3 shows a simplified block diagram of a wireless communication system 300 in which an example embodiment of dynamic adjustment of forward-link rate-control parameters can be employed. Access terminal AT 302 communicates over an air interface 303 with a BTS 306, which is then coupled or integrated with a BSC 308. Transmissions over air interface 303 from BTS 306 to AT 302 represent the forward link to the access terminal. Transmissions over interface 303 from AT 302 to BTS 306 represent the reverse link. Four other access terminals, AT 304-1, 304-2, 304-3, and 304-4, are also depicted in FIG. 3. As indicated, they communicate with BTS 306 over air interfaces 305-1, 305-2, 305-3, and 305-4, respectively. Each of these air interfaces is operationally similar to air interface 303, each representing at least a forward and reverse link. It will be appreciated that the particular arrangement shown is for purposes of illustration.

BSC 308 is connected to MSC 310, which acts to control assignment of air traffic channels (e.g., over air interface 303, 305-1, 305-2, 305-3, and 305-4), and provides access to wireless circuit-switched services such as circuit-voice and circuit-data (e.g., modem-based packet data) service. As represented by its connection to PSTN 314, MSC 310 is also coupled with one or more other MSCs or other telephony circuit switches in the operator's (or in a different operator's) network, thereby supporting user mobility across MSC regions, and local and long-distance landline telephone services. Also connected to MSC 310 is home location register (HLR) 312, which supports mobility-related aspects of subscriber services, including dynamic tracking of subscriber registration location and verification of service privileges.

As shown, BSC 308 is also connected with a PDSN 318 by way of packet control function (PCF) 316. PDSN 318 in turn provides connectivity with a packet-switched network 320, such as the Internet and/or a wireless carrier's private core packet-network. Sitting as nodes on network 320 are, by way of example, an authentication, authorization, and accounting (AAA) server 322, a mobile-IP home agent (HA) 324, and a remote computer 326. After acquiring an air traffic channel over its air interface, an access terminal (e.g., AT 302) may send a request to PDSN 318 for a connection in the packet data network. Then, following authentication of the access terminal by AAA server 320, the access terminal may be assigned an IP address by the PDSN or by HA 324, and may thereafter engage in packet-data communications with entities such as remote computer 326.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as example access terminals 302, 304-1, 304-2, 304-3, and 304-4 typically comprises a user-interface, I/O components, a communication interface, a tone detector, a processing unit, and data storage, all of which may be coupled together by a system bus or other mechanism. As such, system 300, ATs 302, 304-1, 304-2, 304-3, and 304-4, and air interfaces 303, 305-1, 305-2, 305-3, and 305-4 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other neighboring sectors, which may vary as the AT moves about within the wireless communication system, or as other factors cause the AT's RF conditions to change. More particularly, the AT monitors SINR of each of active set and neighboring sectors, and reports its measurements to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 3, and taking an originating call from AT 302 as an example, AT 302 first sends an origination request over air interface 303 and via the BTS 306 and BSC 308 to MSC 310. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1x-RTT), the BSC signals to the PDSN 318 by way of PCF 316. The PDSN 318 and access terminal 302 then negotiate to establish a data link layer connection, such as a point to point protocol (PPP) session. Further, the PDSN 318 sends a foreign agent advertisement that includes a challenge value to the access terminal, and the access terminal responds with a mobile-IP registration request (MIP RRQ), including a response to the challenge, which the PDSN forwards to HA 324. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms), or a rate of 600 time slots per second. Every 16 slots comprise a frame, corresponding to 26.67 ms per frame, and frame boundaries are synchronous across all sectors of a RAN.

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each time slot (800 per half-slot) are allocated for a forward traffic channel or a forward control channel, so that any given time slot will carry either AT-specific traffic-channel data (if any exists) or AT-specific control-channel data. While the 1600 chips of forward-link traffic and/or control channel data of any given time slot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. More specifically, in maintaining its active set, the AT continually monitors the pilot signal from each sector in its active set to determine which has the best RF conditions on its forward link. The quality of the RF conditions on a forward link is measured in terms of SINR (or a similar metric), and the selected sector is designated the AT's "serving sector." The AT determines the supportable data rate on the forward link by using the measured SINR of its serving sector to select one of several pre-determined data rates in a look-up table stored in the AT's memory, for instance. The AT then transmits a request for the selected data rate in a DRC message on the AT's reverse-link DRC sub-channel to its serving sector.

The IS-856 reverse link also includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Operation in an IS-856 compliant communication system may be illustrated, again with reference to FIG. 3. To acquire packet data connectivity under IS-856, after an access terminal first detects an EVDO carrier, the access terminal sends to its BSC (or RNC) 308 a UATI (Universal Access Terminal Identifier) request, and receives in response an UATI, which the access terminal can then use to identify itself in subsequent communications with the BSC. The access terminal then sends a connection-request to the BSC 308, and the BSC responsively invokes a process to authenticate the access terminal and to have the access terminal acquire a data link.

In particular, the BSC 308 sends an access request to an Access Network AAA (ANAAA) server (which may be different than the AAA server 322), and the ANAAA server authenticates the access terminal. The BSC 308 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 318 (via PCF 316), and the PDSN and access terminal then negotiate to establish a PPP data link. In addition, as in the IS-2000 process, the access terminal then sends an MIP RRQ to the PDSN, which the PDSN forwards to the HA 324, and the HA assigns a mobile-IP address for the access terminal to use.

3. Adapting Forward-Link Rate-Control Parameters to Data-Traffic Volume

In an EVDO communication session (i.e., under IS-856), user data are transmitted to an AT on the forward link using a TDM scheme, as described above. The user data are first encoded into data packets, and the packets are transmitted during specific time slots allocated for transmissions to that AT. The AT recovers the user data by decoding each time-slot transmission it receives on its forward link from the base station. Since each time slot is of equal duration (e.g., 1.67 ms under IS-856), the forward-link data rate depends on the amount or the density of data that are transmitted during each time slot, which in turn is determined by the particular encoding scheme used. Hence, different forward-link data rates are achieved by using different encoding schemes, and thus the number of time slots required to transmit a given encoded data packet depends on the encoding scheme used to generate the given data packet.

As described above, under IS-856 a base station (or sector) broadcasts two pilot bursts and a MAC channel during every time slot, possibly as well as any encoded data awaiting transmission. However, the base station may not at every instant have user data to transmit. Consequently, at various times some number of a base station's time slot transmissions may be empty with respect to encoded user data. A time slot corresponding to a transmission containing no encoded packet data is referred to an "idle" time slot. Conversely, a non-idle time slot is one during which a transmission does contain encoded packet data. The ratio of the number of non-idle time slots during a given time window to the total number of time slots (idle plus non-idle) during the given window is referred to as the time-slot utilization, and is a number in the range [0, 1].

When time slot utilization is low (i.e., near zero), AT-bound data arriving at the base station from the network can be transmitted with little or no queuing delay. On the other hand, when time slot utilization is high (i.e., near one), queuing delay can grow. Accordingly, time-slot utilization is an important factor in queuing delay, which in turn impacts overall system performance. Correspondingly, the data rates being used by the base station on the forward link to ATs with active EVDO sessions determine the respective numbers of time slots that each AT's forward-link data packets require for transmission, and thus also factor into the time-slot utilization. As described above, and further explained by way of example below, each AT with an active EVDO session periodically requests a forward-link data rate by sending a DRC request message to the base station. The requested rate is determined based on measured SINR.

a. Operating Principles

In conventional operation under IS-856, an AT maintains a table or other data structure that contains a correlation of preconfigured SINR threshold values with corresponding preconfigured forward-link data rates. For a given measured SINR, the AT does a table look-up to determine a forward-link data rate. The same SINR threshold values apply whether the given SINR measurement represents and increase or a decrease (or no change) with respect to the immediately previous measurement. In practice, each preconfigured forward-link data rate is represented in the table by a DRC code or symbol, rather than by an actual numerical data rate.

The power level of the pilot signal of a given sector is usually specified as a gain level, x, according to the relation x dBm=$10 \log_{10}(P/1$ mW), where P is the power in mW (milliwatts). However, other power units could be specified. Measured in dBm, gain expresses a logarithmic ratio of power P to a fixed power level of 1 mW. As a relative level, SINR of the given sector is then expressed in dB. For example, SINR=+3 dB would correspond to a pilot channel power twice that of the noise and interference from other detectable pilot signals. Similarly, SINR=+6 dB would correspond to a pilot channel power four times that of the noise and interference from other detectable pilot signals.

Figure 4:
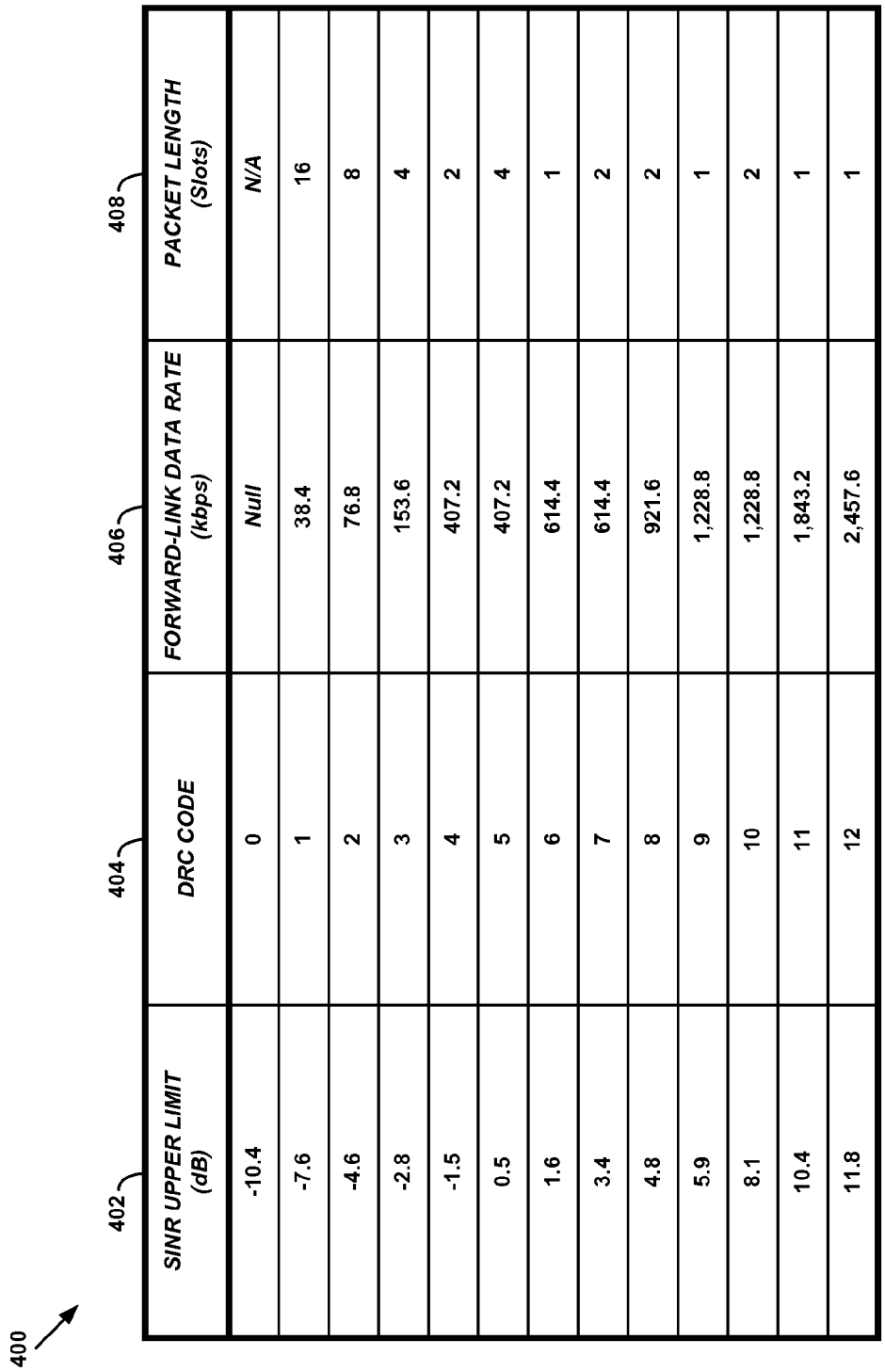
FIG. 4 is an example table of forward-link rate-control parameters and associated data rates and packet lengths.

An example of preconfigured SINR thresholds and forward-link data rates is illustrated in FIG. 4, which presents a Table 400 having four columns. Column 402 lists SINR threshold values in dB in increasing order; column 404 lists the corresponding DRC codes; column 406 lists the corresponding numerical data rates; and column 408 lists number of time slots required for transmitting a packet at the corresponding data rate and DRC code. In practice, an AT would not necessarily store columns 406 and 408, since it only needs to determine a DRC code for a given measured SINR. However, these two columns are included in Table 400 for reference in the discussion of data rate values and the numbers of time slots per packet.

The SINR thresholds in column 402 are applied as upper limits, such that the AT determines the smallest SINR threshold value that is greater than (but not equal to) a given measured SINR, and selects the preconfigured DRC code corresponding with the determined largest SINR threshold value. For example, for a measured SINR of −3.2 dB, the AT would determine the smallest SINR threshold value larger than the measured one to be −2.8 dB, corresponding to a DRC code of 3 and a forward-link data rate of 76.8 kbps. The AT would then transmit the DRC code in a DRC request message, encoded into a four-bit "DRC symbol." The AT would also include the PN offset of the serving base station (or sector) in the DRC request. The serving base station would respond to the DRC request message by transmitting data on the forward link to the AT at the requested rate. In doing so, the serving base station would use a look-up table (or other recorded data structure) having the same mapping of DRC codes to forward-link data rates as Table 400 to interpret the received DRC request.

It is evident from Table 400 that as SINR increases, so does the data rate (column 406). At the same time, the number of time slot per packet generally decreases, although not monotonically in the example. In any case, as SINR and the corresponding data rate increases for a given AT, the base station will generally be able to transmit user data to the given AT more rapidly, and hence tend to reduce or avoid a data backlog for that AT. This effect is cumulative with other ATs that are being actively served by the base station.

Figure 5:
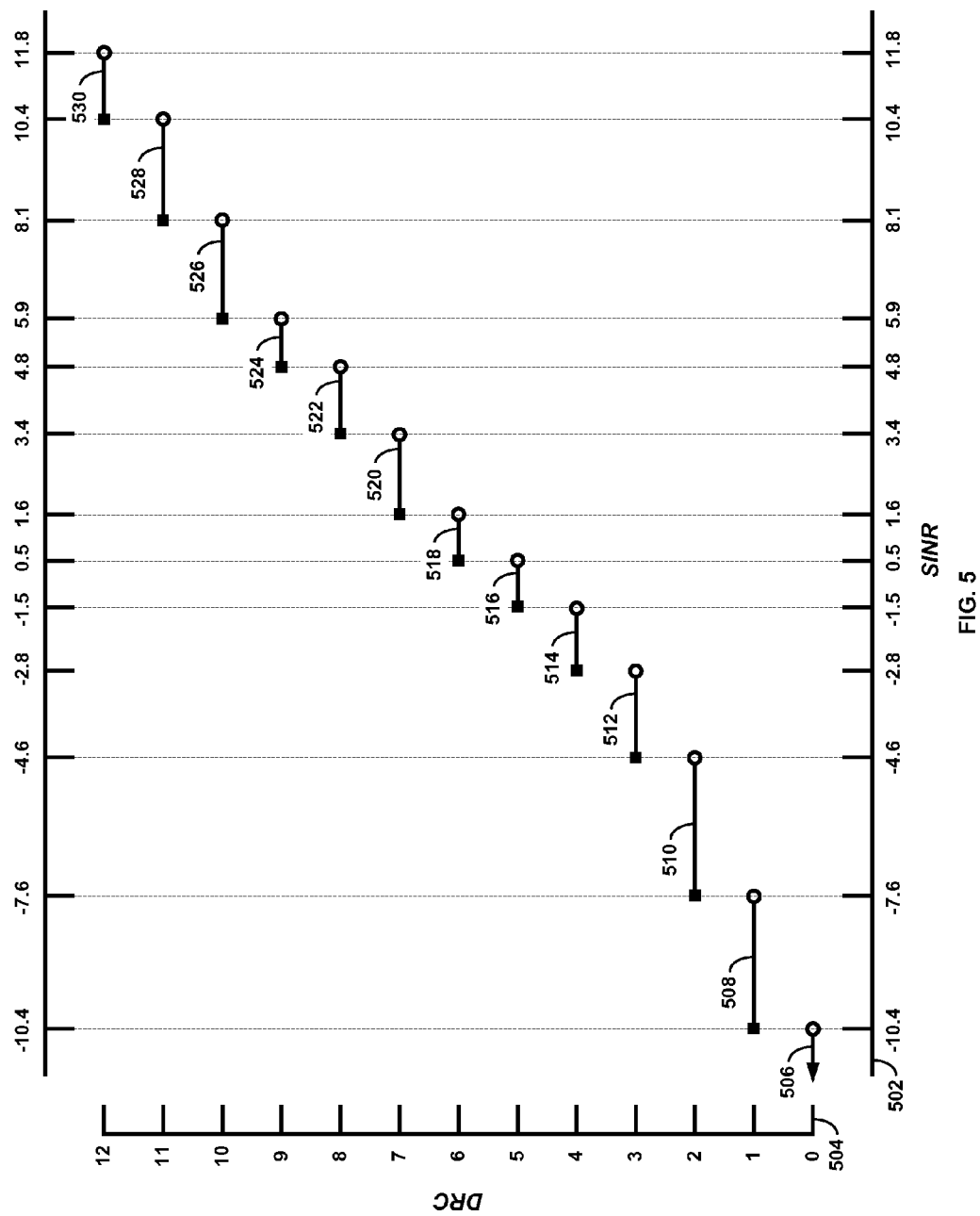
FIG. 5 illustrates an example a single functional relationship between signal-to-noise ratio of a forward link and requested forward-link data rate, where the same single functional relationship applies to both increased and decreased measured signal-to-noise ratio.

FIG. 5 depicts an example functional relation between SINR and DRC codes that further illustrates how the conventional single tabulation is applied. The functional relation includes a horizontal SINR axis 502 and a vertical DRC code axis 504. The SINR threshold values of column 402 in Table 400 are marked along the axis 502, and dashed vertical lines at each threshold value are shown for reference in the plane of the plot. For each SINR threshold value along the axis 502, there is a horizontal range line, for a total of 13 range lines 506, 508, 510, . . . , 528, 530 in all. Each range line has an open circle at the right at the position of the corresponding SINR threshold value, and a solid square at the left at the position the next smaller SINR threshold value. The vertical position of each range line is at the DRC code corresponding to the SINR threshold value of the range line. Note that since the SINR threshold of −10.4 dB is the smallest value in the example tabulation, there is no lower bound (solid square) on the associated range line; a leftward arrow is used instead.

Continuing with the example above, a measured a SINR of −3.2 dB would fall in the range of range line 512, corresponding to a DRC code of 3. If the next measurement of SINR yielded, e.g., 0.1 dB, the AT would select a DRC code of 5, corresponding to range line 516. If the next measure of SINR dropped to −1.8 dB the AT would select a DRC code of 4, corresponding to range line 514. Thus, in conventional operation, the same table and/or functional relationship would be applied whether successive measurements of SINR increased or decreased.

b. Adjusting Rate-Control Parameters

In accordance with the example embodiment, the access terminal will operate in one of two states with respect determination of forward-link data rate. In the first state, the AT will use a single tabulation, as described above. In the second state, the AT will use a dual tabulation, as discussed earlier and further explained by way of example below. The AT will transition between states in response to time slot utilization, as reported by the base station.

More particularly, when the base station determines that time slot utilization of the forward link exceed a threshold utilization level, it will broadcast a high slot-utilization message to access terminals it is serving. As an example, the threshold utilization level could be 0.7 (i.e., 70%), although other values in the range [0, 1] could be used. In response to receiving a high slot-utilization message, an access terminal operating in the first state will begin using a dual-tabulation determination of forward-link data rates.

FIG. 6 illustrates three tables of the two-state operation of the example embodiment. Table 602, labeled "SINR Increase and Decrease Table," is the single table of the conventional operation described above. Table 604, labeled "SINR Increase Table," is a first tabulation used by the AT when it measures a SINR value that is greater than the immediately previous measurement. Table 604, labeled "SINR Decrease Table," is a second tabulation used by the AT when it measures a SINR value that is less than the immediately previous measurement. All three tables could be stored as data structures in some form of memory in the AT, such as flash, solid state, or a register, for example. Other forms of storage are possible as well. Since the SINR threshold values in the single tabulation differ from those of the dual tabulation, the transition between states can also be considered as a dynamic adjustment of forward-link rate-control parameters.

As is evident from comparing the tables in FIG. 6, the SINR threshold values of the SINR Increase Table 604 are smaller than those of the single SINR Increase and Decrease Table 602. Hence, the AT will tend to select and request increased forward-link data rates for smaller SINR measurements when using the increase table 604 than when using the increase/decrease table 602. In this sense, the AT more aggressively requests increased forward-link data rates when using increase table 604.

Similarly, the SINR threshold values of the SINR Decrease Table 606 are smaller than those of the SINR Increase Table 604. Hence, the AT will generally select and request decreased forward-link data rates for smaller SINR when using the decrease table 606 than when using the increase table 604. In this sense, the AT less aggressively requests decreased forward-link data rates when using the decrease table 606.

For example, if the AT measures an increase in SINR (with respect to a previous measurement) to a value of −3.2 dB, then using the increase table 604, the AT would determine the threshold SINR of −2.5 dB and select and request a DRC of 4. The same determination using the increase/decrease table 602 would yield a DRC of 3, as in the example above. If the AT next measures a decrease in SINR to a value of −3.8 dB, for instance, then using the decrease table 606, the AT would determine the threshold SINR of −3.0 dB and still select and request a DRC of 4. Thus, even though the value of −3.8 dB is too small to correspond to a DRC of 4 in the increase table 604, it is not small enough to correspond to dropping down to a DRC of 3 in the decrease table 606. The measured SINR would have to drop to −4.0 dB or less in order to correspond to a DRC of 3 in the decrease table 606. A similar analysis can be applied to other examples of measured SINR.

As described above, the AT selects which of the two tabulations to use depending on whether a given measured SINR represents an increase or a decrease with respect the immediately previous measured SINR. In further accordance with the example embodiment, the AT also needs to account for the difference between the previous measured SINR and one or another of the SINR threshold values in the selected tabulation. Operation of the example embodiment is further explained below in terms of a dual functional relationship between SINR and requested forward-link data rate.

Figure 7:
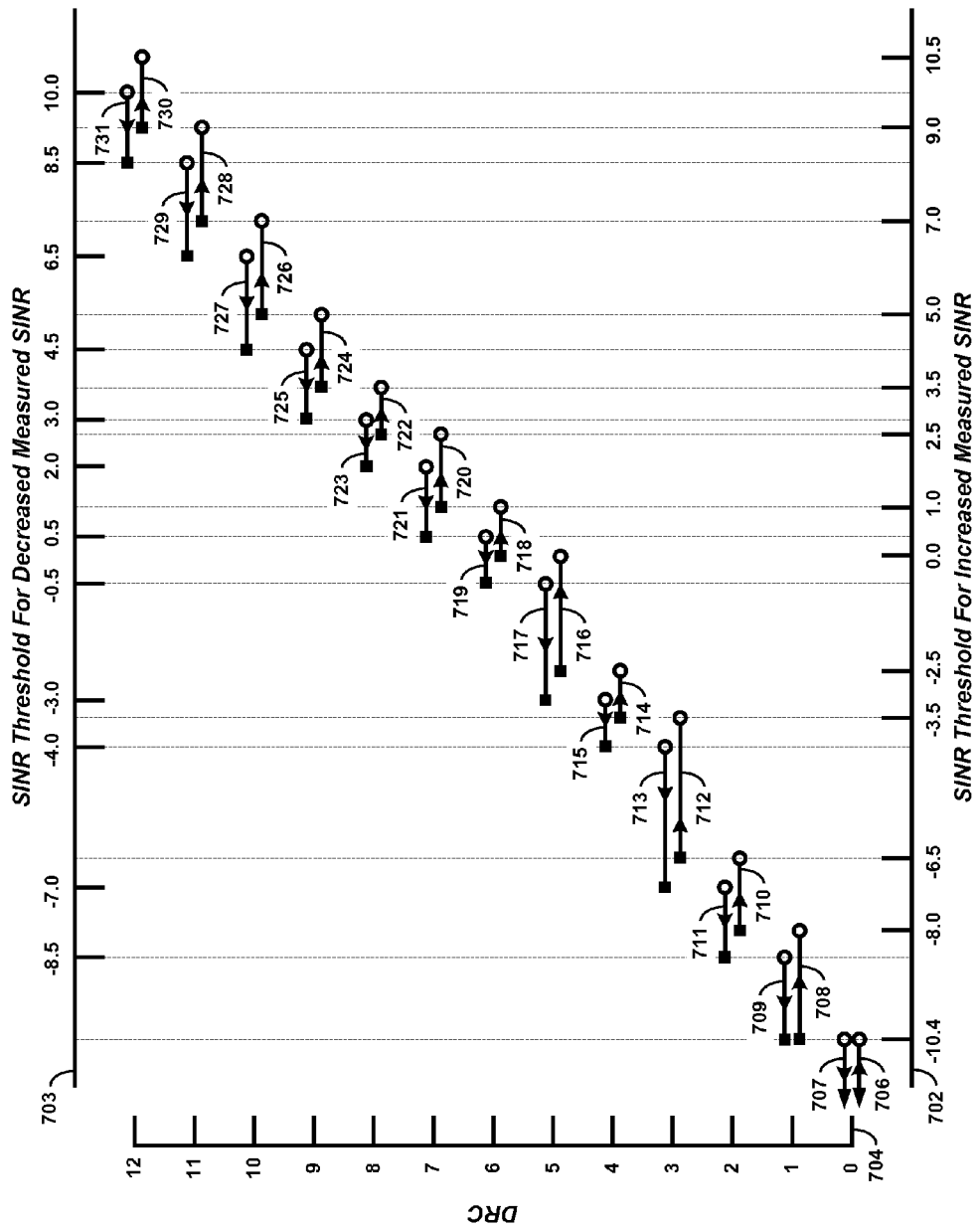
FIG. 7 illustrates an example a dual functional relationship between signal-to-noise ratio of a forward link and requested forward-link data rate, where one functional relationship applies to increased measured signal-to-noise ratio, and another, different functional relationship applies to decreased measured signal-to-noise ratio.

FIG. 7 illustrates an example a two different functional relationships between SINR and requested forward-link data rate, where one functional relationship applies to increased measured SINR, and a different functional relationship applies to decreased measured SINR. Here, "increased" and "decreased" are taken to be with respect to an immediately previous measurement of SINR that was used to make a determination of requested forward-link data rate. The format of FIG. 7 is similar to that of FIG. 5, but with two different sets of range lines, one for increased measured SINR and another for decrease measure of SINR.

Specifically, the dual functional relation includes one horizontal SINR axis 702 at the bottom of the plot for increased measured SINR, another horizontal SINR axis 703 at the top of the plot for decreased measured SINR, and a vertical DRC code axis 704. The SINR threshold values of the increase table 604 are marked along the axis 702, with dashed vertical lines at each of the first set of threshold values shown for reference in the plane of the plot. Similarly, the SINR threshold values of decrease table 606 are marked along the axis 703, with dashed vertical lines at each of the second set of threshold values shown for reference in the plane of the plot.

For each SINR threshold value along the axis 702, there is a horizontal range line, for a total of 13 range lines 706, 708, 710, . . . , 728, 730 for increased measured SINR. Similarly, there are another 13 range lines 707, 709, 711, . . . , 729, 731 shown for decreased measured SINR, one for each SINR threshold value along the axis 703. As with FIG. 5, each range line has an open circle at the right at the position of the corresponding SINR threshold value and a solid square at the left at the position the next smaller SINR threshold value. As a visual cue, each range line for increased measured SINR has a rightward arrow (towards increasing SINR). Similarly, each range line for decreased measured SINR has a leftward arrow (towards decreasing SINR). The vertical position of each line is approximately at the DRC code corresponding to the SINR threshold value, but with a slight offset above or below the corresponding DRC value, in order to fit both sets of range lines on one plot. Note again that since the SINR threshold of −10.4 dB is the smallest value in the example tabulations, there is no lower bound (solid square) on the associated range line; a leftward arrow is used instead.

Example operation can be illustrated by considering first an example previous measured SINR of −2.2 dB and an example new measured SINR of −0.7 dB. This represents an increase, so the increase table 604 would be used, corresponding to the axis 702 in FIG. 7. Ignoring for the moment the difference between the previous measured SINR of −2.2 dB and SINR thresholds in the increase table 604, it may be seen that the new measured SINR of −0.7 dB falls in the range of range line 716, corresponding to a DRC code of 5.

Continuing with the example operation, if the next measurement of SINR (after SINR=−0.7 dB) were −2.8 dB, representing a decrease, the AT would use decrease table 606, corresponding to the axis 703 in FIG. 7. Once more ignoring for the moment the difference between the now-previous measured SINR of −0.7 dB and SINR thresholds in the decrease table 606, it may be seen that the new measured SINR of −2.8 dB falls in the range of range line 717, again corresponding to a DRC code of 5. It may also be seen that SINR=−2.8 dB is below the SINR threshold of −2.5 dB for a DRC of 4 in the increase table 604 (corresponding to range line 714 in FIG. 7), but still above the threshold of −3.0 dB for a DRC of 4 in the increase table 606 (corresponding to range line 715 in FIG. 7). Thus, based on having used the decrease table 606, the AT continues to request a forward-link data rate according to a DRC of 5.

The next two example measured SINRs illustrates how account is taken of the difference between the previous measured SINR and one or another SINR threshold in increase table 604 or the decrease table 606.

If the next measurement of SINR (after SINR=−2.8 dB) were −2.6 dB, representing an increase, the AT would use increase table 604, corresponding to the axis 702 in FIG. 7. It may be seen that the new measured SINR of −2.6 dB falls in the range of range line 714, which corresponds to a DRC code of 4. However, since the previous determination yielded a DRC code of 5, this new determination of DRC code=4 would represent a decrease in forward-link data rate, even though measured SINR had increased. In order to avoid this situation, the example method includes a first conditional test that if the determination using the increase table 604 indicates a decrease in forward-link data rate (or a decrease in DRC), the previously-determined forward-link data rate will be selected instead. Thus in this example case, the AT would again select a DRC code of 5, even though the increase table 604 indicates a decrease to a DRC of 4.

An alternate formulation of the first conditional test is: given an initial forward-link data rate (or initial DRC code) based on an initial measured SINR, and given a new measured SINR that is greater than the initial SINR so that the increase table 604 is used, a new forward-link data rate (or new DRC) determined from the increase table 604 and based on the new measured SINR can be greater than or equal to the initial forward-link data rate, but not less than the initial forward-link data rate (the new DRC can be greater than or equal to the initial DRC but not less than the initial DRC).

A similar conditional test, with a similar explanation, applies to determination of the forward-link data rate upon a measurement of a decreased SINR. Again by way of example, if a previous measurement yielded SINR=−0.2 dB and a DRC code=5, and a new measurement yielded SINR=−0.4 dB, representing a decrease, the AT would use decrease table 606, corresponding to the axis 703 in FIG. 7. In this case, the new measured SINR of −0.4 dB falls in the range of range line 719, which corresponds to a DRC code of 6. However, since the previous determination yielded a DRC code of 5, this new determination of DRC code=6 would represent an increase in forward-link data rate, even though measured SINR had decreased. In order to avoid this situation, the example method includes a second conditional test that if the determination using the decrease table 606 indicates an increase in forward-link data rate (or an increase in DRC), the previously-determined forward-link data rate will be selected instead. Thus in this example case, the AT would again select a DRC code of 5, even though the decrease table 606 indicates an increase to a DRC of 6.

An alternate formulation of the second conditional test is: given an initial forward-link data rate (or initial DRC code) based on an initial measured SINR, and given a new measured SINR that is less than the initial SINR so that the decrease table 606 is used, a new forward-link data rate (or new DRC) determined from the decrease table 606 and based on the new measured SINR can be less than or equal to the initial forward-link data rate, but not greater than the initial forward-link data rate (the new DRC can be less than or equal to the initial DRC but not greater than the initial DRC).

In further accordance with the example embodiment, when the base station determines that time slot utilization of the forward link drops below a threshold utilization level, it will broadcast a low slot-utilization message to access terminals it is serving. Again by way of example, the threshold utilization level could be 0.7 (i.e., 70%), although other values in the range [0, 1] could be used. In response to receiving a low slot-utilization message, an access terminal operating in the second state will transition to operating in the first state, using the conventional, single-tabulation determination of forward-link data rates.

In still further accordance with the example embodiment, AT operating in the second state will monitor a packet error rate (PER) of data packets received on the forward link from the base station. If the AT determines that the PER exceeds a threshold PER, it will transition to operating in the first state. In this way, the AT will avoid a situation in which operation in the second state results in unintended degraded performance.

4. Implementation of Example Embodiment

As described above, the example embodiment involves actions and operations carried out by both the access terminal and the base station (or sector). As such, the example embodiment may be considered as comprising a "client-side," associated with the access terminal (or other client communication device), and a "system-side," associated with the base station (or sector, or other RAN element). The example embodiment can be implemented as executable steps and operations of a client-side method carried out by an access terminal, and as executable steps and operations of a system-side method carried out by a base station (or BTS cell or sector).

Implementation of the example embodiment can further be considered as including means for carrying out both the client-side method and the system-side method. An example implementation of both the client-side method and means and the system-side method and means is described below. By way of example, both the access terminal and the base station are taken to be configured to operate according to IS-856 in a similarly-compliant wireless communication system, such as the one described above in connection with FIG. 3.

a. Example Method Implementation in an Access Terminal

Figure 8:
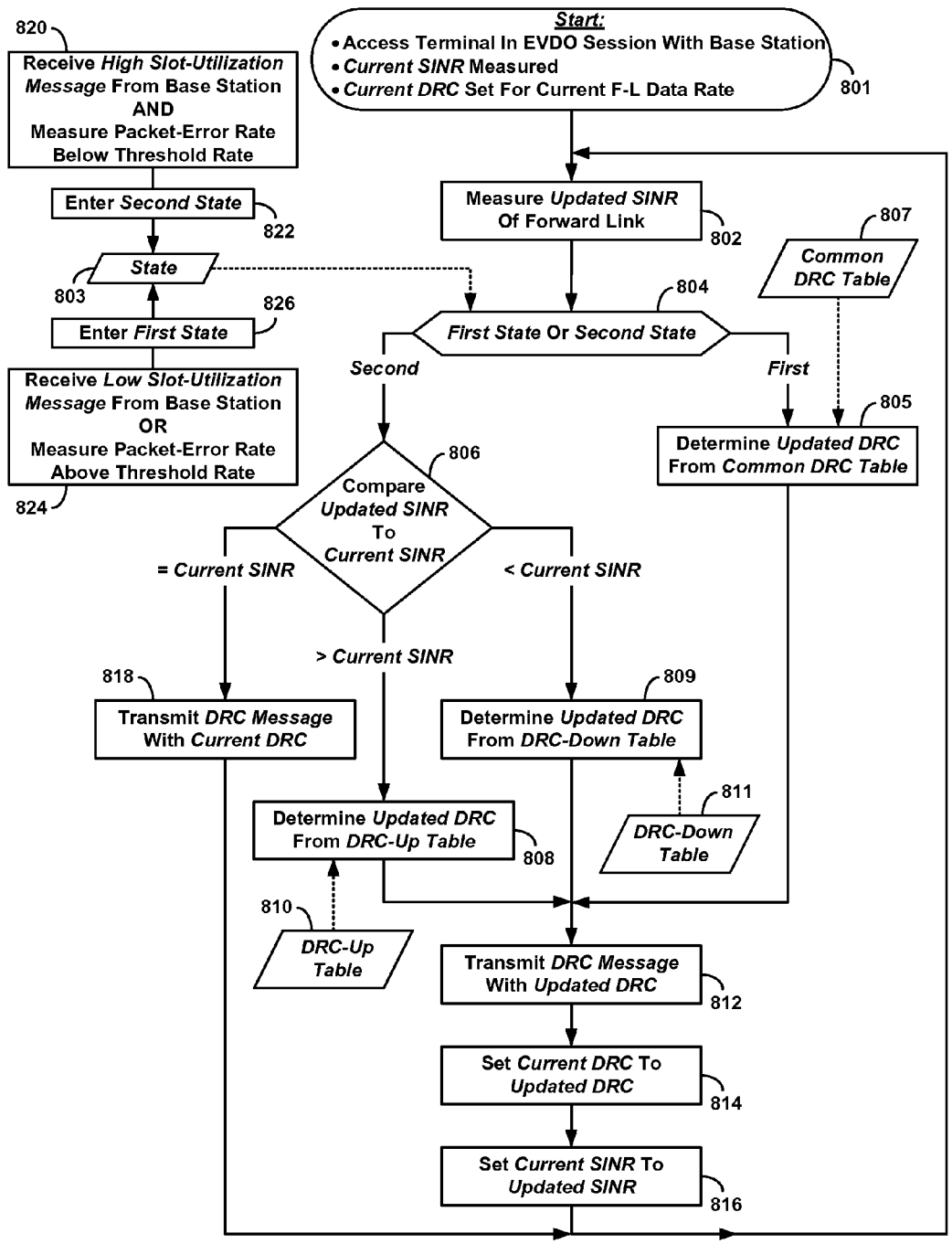
FIG. 8 illustrates an example embodiment of logical steps for implementing in an access terminal a method of dynamic adjustment of forward-link rate-control parameters.

FIG. 8 is a logical flowchart representing executable steps and operations that could be carried out by an access terminal to implement an example client-side method of dynamic adjustment of forward-link rate-control parameters. The illustrated steps could be implemented in an AT (or similar device) as executable instructions stored in the memory of the AT and executed by one or more processors of the AT. The executable instructions could also be stored on some form of non-transitory tangible computer readable storage medium, such as magnetic or optical disk, or the like, and provided for transfer to the AT's memory during configuration or other step(s) for preparing the AT for operation.

By way of example, the AT is taken to be initially in an active EVDO session in a sector (referred to generically as a base station). This is indicated at the start step 801. Also indicated at step 801, the AT has a Current measured SINR and Current DRC for the forward link. At step 802, the AT measures an update SINR.

At step 804, the AT determines whether it is operating in the first state or in the second state by consulting a State variable 803 (as indicated by the dashed arrow from State variable 803 to step 804). If the AT is operating in the first state ("First" branch from step 804), the AT determines (at step 805) an update DRC code from the Common DRC Table 807 (as indicated by the dashed arrow from Common DRC Table 807 to step 805). This table corresponds to the Increase and Decrease table 602 in FIG. 6 and discussed above.

The AT then proceeds to step 812, where it transmits the updated DRC to the base station in a DRC request message. At step 814, the AT then sets the Current DRC to the updated DRC, and at step 816 sets the Current SINR to the updated SINR. These last two steps prepare the AT for the next iteration of the process, which starts again at set 802 with the next updated SINR measurement.

If at step 804 the AT is operating in the second state ("Second" branch from step 804), the AT proceeds to step 806 where compares the update SINR measure with Current SINR. If the update SINR equals the Current SINR ("=Current SINR" branch from step 806), then at step 818, the AT transmits the Current DRC to the base station in a DRC request message. The AT then returns to step 802 for the next updated SINR measurement.

If at step 806 the updated SINR is greater than the Current SINR ("≥Current SINR" branch from step 806), the AT proceeds to step 808, where determines an updated DRC code from the DRC-Up Table 810 (as indicated by the dashed arrow from DRC-Up Table 810 to step 808). This table corresponds to the Increase Table 604 in FIG. 6 and discussed above. Then the AT again proceeds to step 812, where it transmits the updated DRC to the base station in a DRC request message, to step 814, where the AT sets the Current DRC to the updated DRC, and to step 816, where the sets the Current SINR to the updated SINR. The AT then returns to step 802 for the next updated SINR measurement.

If at step 806 the updated SINR is less than the Current SINR ("<Current SINR" branch from step 806), the AT proceeds to step 809, where determines an updated DRC code from the DRC-Down Table 811 (as indicated by the dashed arrow from DRC-Down Table 811 to step 809). This table corresponds to the Decrease Table 606 in FIG. 6 and discussed above. Then the AT again proceeds to step 812, where it transmits the updated DRC to the base station in a DRC request message, to step 814, where the AT sets the Current DRC to the updated DRC, and to step 816, where the sets the Current SINR to the updated SINR. The AT then returns to step 802 for the next updated SINR measurement.

The example logic of FIG. 8 also includes the AT's transitions between the first and second states in response to receiving slot-utilization messages from base station and to monitoring the packet error rate message. Specifically, at step 820, in response to receiving a High Slot-Utilization Message from the base station and to measuring a packet-error rate below a threshold PER rate, the AT enters (at step 822) the second state and marks the State variable 803 accordingly. Conversely, at step 824, in response to receiving a Low Slot-Utilization Message from the base station or to measuring a packet-error rate above the threshold PER rate, the AT enters (at step 826) the first state, and again marks the State variable 803 accordingly.

It will be appreciated that the steps shown in FIG. 8 are meant to illustrate operation of an example embodiment. In addition, various steps could be altered or modified, the ordering of certain steps could be changed, and additional steps could be added, while still achieving the overall desired operation.

b. Example Method Implementation in a Base Station

Figure 9:
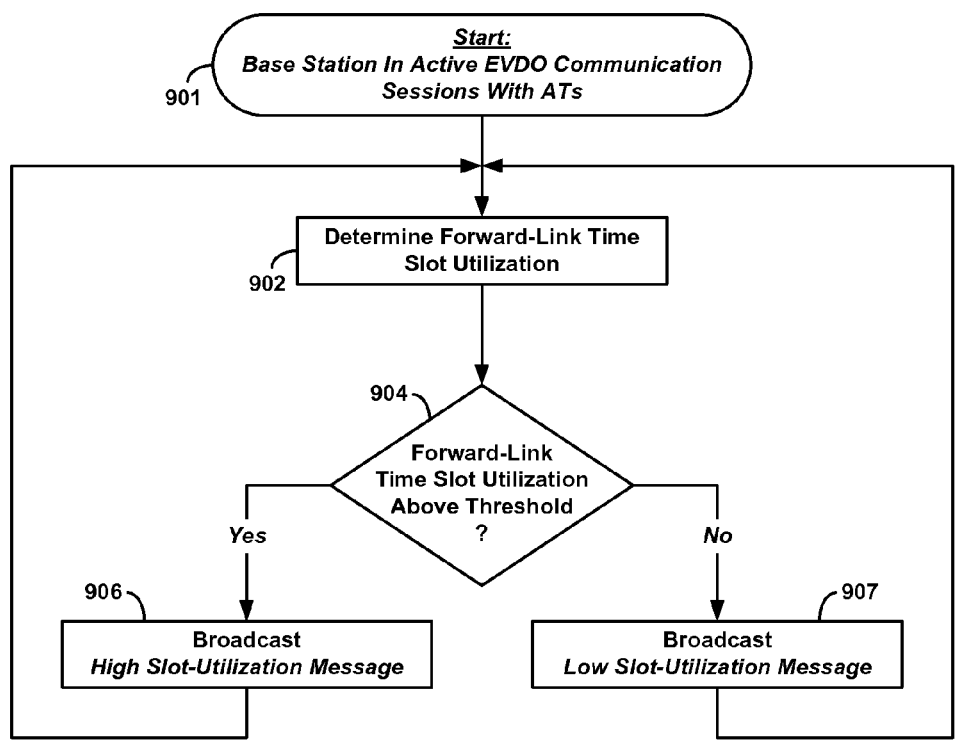
FIG. 9 illustrates an example embodiment of logical steps for implementing in a base station a method of dynamic adjustment of forward-link rate-control parameters.

FIG. 9 is a logical flowchart representing executable steps and operations that could be carried out by base station to implement an example system-side method of dynamic adjustment of forward-link rate-control parameters. The illustrated steps could be implemented in a base station, BTS (or other RAN element) as executable instructions stored in the memory of the base station and executed by one or more processors of the base station. The executable instructions could also be stored on some form of non-transitory tangible computer readable storage medium, such as magnetic or optical disk, or the like, and provided for transfer to the base station's memory during configuration or other step(s) for preparing the base station for operation.

At the start 901, the base station is engaged active EVDO data sessions with a plurality of access terminals. At step 902, the base station determines it forward-link time slot utilization.

At step 904, the base station determines if the time slot utilization is above or below a threshold level. The threshold level could be 0.7 (70%), although other values could be used. If the time slot utilization is above the threshold ("Yes" branch from step 904), the base station at step 906 broadcasts a High Slot-Utilization Message to the access terminals it is serving. The process then returns to step 902, where the base station makes its next determination of time slot utilization.

If at step 904, the time slot utilization is not above the threshold ("No" branch from step 904), the base station at step 907 broadcasts a Low Slot-Utilization Message to the access terminals it is serving. The process then returns to step 902, where the base station makes its next determination of time slot utilization. Note that equality of the measured time slot utilization with the threshold value could be incorporated into either of steps 906 or 907 as a matter of design choice, for example.

It will be appreciated that the steps shown in FIG. 9 are meant to illustrate operation of an example embodiment. As such, various steps could be altered or modified, the ordering of certain steps could be changed, and additional steps could be added, while still achieving the overall desired operation.

c. Example Access Terminal

Figure 10:
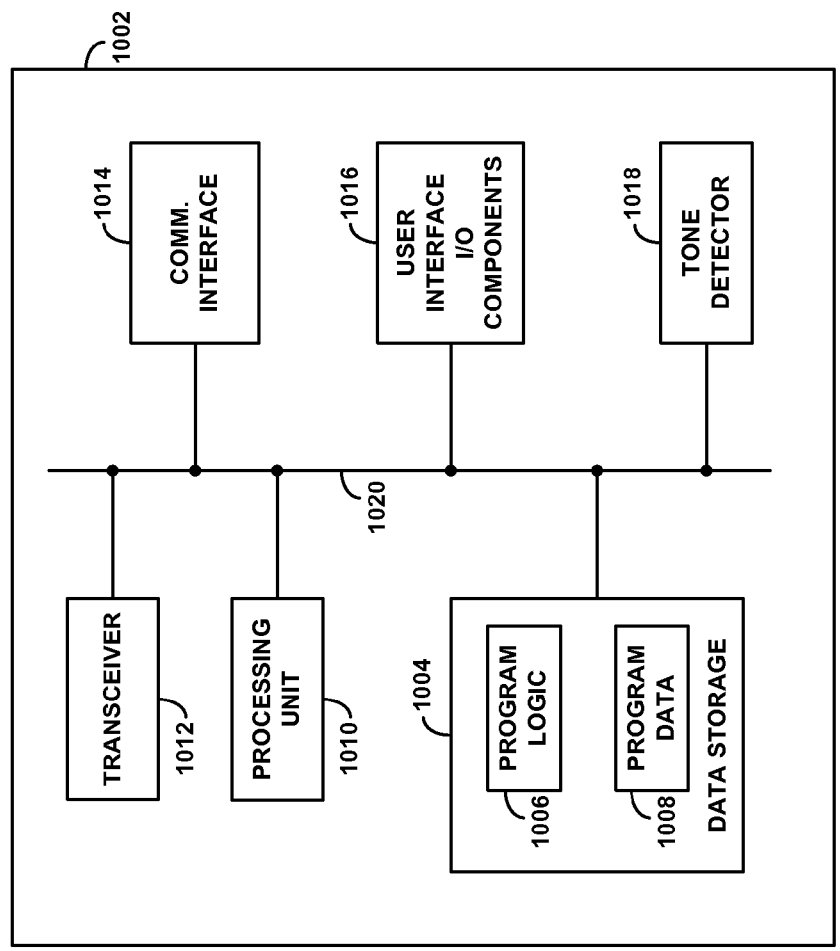
FIG. 10 is a block diagram of an example access terminal in which dynamic adjustment of forward-link rate-control parameters may be implemented.

FIG. 10 is a simplified block diagram depicting functional components of an example access terminal 1002 in which client-side operation of dynamic adjustment of reverse-link rate-control parameters may be implemented. The example AT 1002 could be a cell phone, a personal digital assistant (PDA), a pager, a wired or wirelessly-equipped notebook computer, or any other sort of device. As shown in FIG. 10, the example AT 1002 includes data storage 1004, processing unit 1010, transceiver 1012, communication interface 1014, user-interface I/O components 1016, and tone detector 1018, all of which may be coupled together by a system bus 1020 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 1002 relevant to synchronized determination of rate control are discussed briefly below.

Communication interface 1014 in combination with transceiver 1012, which may include one or more antennas, enables communication with the network, including reception of slot-utilization messages from the serving base station, as well as support for other forward and reverse link channels. The communication interface may include a module, such as an MSMT™-series chipset made by Qualcomm Inc. of San Diego, Calif., and supports wireless packet-data communications according to a CDMA family of protocols.

Processing unit 1010 comprises one or more general-purpose processors (e.g., INTEL microprocessors) and/or one or more special-purpose processors (e.g., dedicated digital signal processor, application specific integrated circuit, etc.). In turn, the data storage 1004 comprises one or more volatile and/or non-volatile storage components, such as magnetic or optical memory or disk storage. Data storage 1004 can be integrated in whole or in part with processing unit 1010, as cache memory or registers for instance. In example AT 1002, as shown, data storage 1004 is configured to hold both program logic 1006 and program data 1008.

Program logic 1006 may comprise machine language instructions that define routines executable by processing unit 1010 to carry out various functions described herein. In particular the program logic, communication interface, and transceiver may operate cooperatively to carry out logical operation such as that discussed above and illustrated in FIG. 8.

It will be appreciated that there can be numerous specific implementations of an access terminal, such as AT 1002, in which the client-side method of dynamic adjustment of forward-link rate-control parameters could be implemented. Further, one of skill in the art would understand how to devise and build such an implementation. As such, AT 1002 is representative of means for carrying out the client-side method of dynamic adjustment of forward-link rate-control parameters, in accordance with the methods and steps described herein by way of example.

d. Example Base Station

Figure 11:
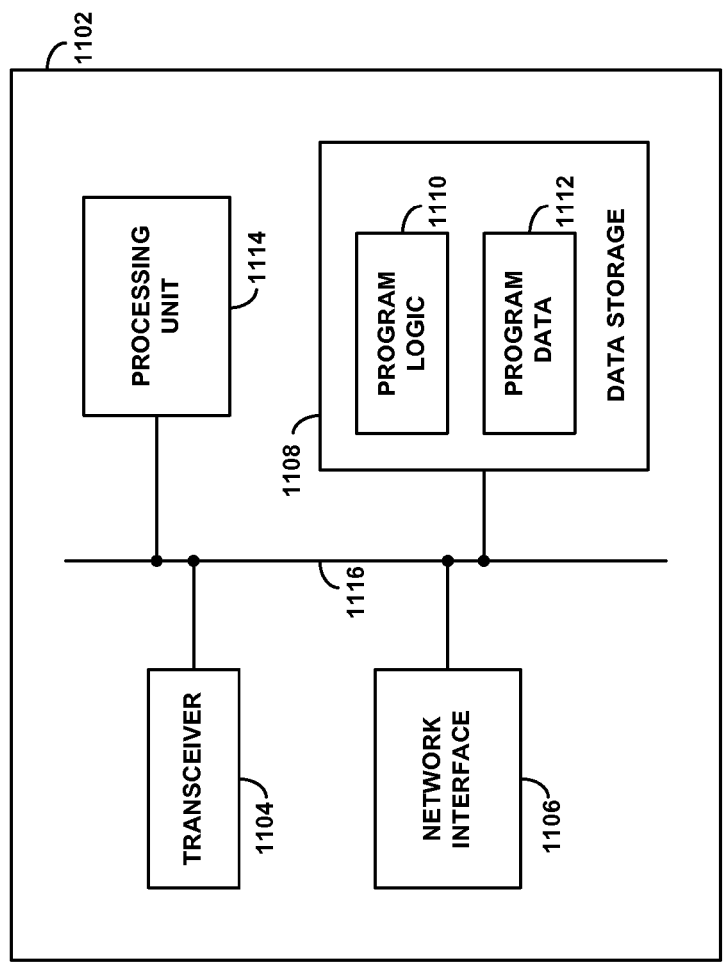
FIG. 11 is a block diagram of an example base station in which dynamic adjustment of forward-link rate-control parameters may be implemented.

FIG. 11 is a simplified block diagram depicting functional components of an example base station 1102 in which system-side operation of dynamic adjustment of reverse-link rate-control parameters may be implemented. As shown in FIG. 11, the example base station 1102, representative of BTS 304 or BSC 306 integrated with BTS 304 in FIG. 3, for instance, includes a transceiver 1104, network interface 1106, a processing unit 1114, and data storage 1108, all of which may be coupled together by a system bus 1116 or other mechanism. In addition, the base station may also include external storage, such as magnetic or optical disk storage, although this is not shown in FIG. 11.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 1102 relevant to dynamic adaptation of synchronized determination of rate control are discussed briefly below.

Network interface 1106 enables communication on a network, such network 300. As such, network interface 1106 may take the form of trunk or optical link that can be coupled with a TDM switch such as MSC 1108, or an Ethernet network interface card or other physical connection that can be coupled with PCF 314, for instance. Further, network interface 1106 in combination with transceiver 1104, which may include one or more BTS antennas, enables air interface communication with one or more access terminals, supporting forward-link transmissions of protocol version messages, among other message and commands, and supporting reception reverse-link traffic on reverse links.

Processing unit 1114 comprises one or more general-purpose processors (e.g., INTEL microprocessors) and/or one or more special-purpose processors (e.g., dedicated digital signal processor, application specific integrated circuit, etc.). In turn, the data storage 1108 comprises one or more volatile and/or non-volatile storage components, such as magnetic or optical memory or disk storage. Data storage 1108 can be integrated in whole or in part with processing unit 1114, as cache memory or registers for instance. As further shown, data storage 1108 is equipped to hold program logic 1110 and program data 1112.

Program logic 1110 may comprise machine language instructions that define routines executable by processing unit 1114 to carry out various functions described herein. In particular the program logic, communication interface, and transceiver may operate cooperatively to carry out logical operation such as that discussed above and illustrated in FIG. 9.

It will be appreciated that there can be numerous specific implementations of a base station (or BTS or other RAN element), such as base station 1102, in which the system-side method of dynamic adjustment of forward-link rate-control parameters could be implemented. Further, one of skill in the art would understand how to devise and build such an implementation. As such, base station 1102 is representative of means for carrying out the system-side method of dynamic adjustment of forward-link rate-control parameters, in accordance with the methods and steps described herein by way of example.

5. Conclusion

An example embodiment of the present invention has been described above. Those skilled in the art will understand, however, that changes and modifications may be made to this embodiment without departing from the true scope and spirit of the invention, which is defined by the claims.

What is claimed:

1. In an access terminal configured to operate in a wireless communication system that includes a base station, a method comprising:
  determining an initial forward-link data rate based on an initial signal-to-noise ratio (SNR) measurement of a forward link from the base station, the initial SNR measurement having been made by the access terminal at an initial time;
  subsequent to the initial time, determining an updated SNR measurement of the forward link from the base station;
  upon determining that the updated SNR measurement is greater than the initial SNR measurement, making a determination of a first updated forward-link data rate selected from a first tabulation of forward-link data-rate values each associated with a respective SNR threshold value of the first tabulation, and transmitting a request to the base station to receive data on the forward link at the determined first updated forward-link data rate; and
  upon determining that the updated SNR measurement is less than the initial SNR measurement, making a determination of a second updated forward-link data rate selected from a second tabulation of forward-link data-rate values each associated with a respective SNR threshold value of the second tabulation, and transmitting a request to the base station to receive data on the forward link at the determined second updated forward-link data rate,
  wherein the first and second tabulations are different.

2. The method of claim 1, further comprising:
  upon a determination that the updated SNR measurement is equal to the initial SNR measurement, transmitting a request to the base station to receive data on the forward link at the initial forward-link data rate.

3. The method of claim 1, wherein the access terminal is further configured to operate according to a CDMA family of protocols including at least IS-856,
  wherein transmitting the request to the base station to receive data on the forward link at the determined first updated forward-link data rate comprises transmitting an indication of the determined first updated forward-link data rate in a Data Rate Control (DRC) message to the base station,
  and wherein transmitting the request to the base station to receive data on the forward link at the determined second updated forward-link data rate comprises transmitting an indication of the determined second updated forward-link data rate in a DRC message to the base station.

4. The method of claim 1, wherein making the determination of the first updated forward-link data further comprises replacing the initial SNR measurement with the updated SNR measurement and replacing the initial forward-link data rate with the determined first updated forward-link data rate, and wherein making the determination of the second updated forward-link data further comprises replacing the initial SNR measurement with the updated SNR measurement and replacing the initial forward-link data rate with the determined second updated forward-link data rate.

5. The method of claim 1, wherein the first tabulation comprises a first list of first SNR threshold values, each being mutually associated with a respective forward-link data-rate value in a corresponding list of forward-link data-rate values,
wherein making the determination of the first updated forward-link data rate comprises (i) determining a smallest first SNR threshold value in the first list that is greater than the updated SNR measurement, (ii) making a first determination of the respective forward-link data-rate value mutually associated with the determined smallest first SNR threshold value, (iii) if the first determined respective forward-link data-rate value is not less than the initial forward-link data rate, setting the first updated forward-link data rate to the first determined respective forward-link data-rate value, and (iv) if the first determined respective forward-link data-rate value is less than the initial forward-link data rate, setting the first updated forward-link data rate to the initial forward-link data rate,
wherein the second tabulation comprises a second list of second SNR threshold values, each being mutually associated with a respective forward-link data-rate value in the corresponding list of forward-link data-rate values,
wherein making the determination of the second updated forward-link data rate comprises (i) determining a smallest second SNR threshold value in the second list that is greater than the updated SNR measurement, (ii) making a second determination of the respective forward-link data-rate value mutually associated with the determined smallest second SNR threshold value, (iii) if the second determined respective forward-link data-rate value is not greater than the initial forward-link data rate, setting the second updated forward-link data rate to the second determined respective forward-link data-rate value, and (iv) if the second determined respective forward-link data-rate value is greater than the initial forward-link data rate, setting the second updated forward-link data rate to the initial forward-link data rate,
and wherein for each non-zero forward-link data-rate value in the corresponding list, the mutually associated first SNR threshold value in the first list is greater than the mutually associated second SNR threshold value in the second list.

6. The method of claim 5, wherein the access terminal is further configured to operate according to a CDMA family of protocols including at least IS-856,
wherein the initial SNR measurement of the forward link from the base station is an initial measurement by the access terminal of Signal to Interference plus Noise (SINR) of the forward link from the base station,
wherein determining the updated SNR measurement of the forward link from the base station comprises making an updated measurement of SINR of the forward link from the base station,
wherein the first list of first SNR threshold values comprises a first list of SINR threshold values, and the second list of second SNR threshold values comprises a second list of SINR threshold values,
and wherein the corresponding list comprises a list of Data Rate Control (DRC) codes indicative of the forward-link data-rates.

7. In an access terminal configured to operate in a wireless communication system that includes a base station, a method comprising:
operating in a first state in which at least: the access terminal requests a forward-link data rate from the base station by
(i) measuring a signal-to-noise ratio (SNR) of a forward link from the base station,
(ii) determining a first-state forward-link data rate by correlating the measured SNR with a forward-link data-rate value in a single tabulation of forward-link data-rate values each associated with a respective SNR threshold value of the single tabulation, regardless of whether the measured SNR is greater than or less than a previously-measured SNR of the forward link,
and (iii) transmitting a request to the base station to receive data on the forward link at the determined first-state forward-link data rate;
while operating in the first state, receiving a high slot-utilization message from the base station; and
in response to receiving the high slot-utilization message, transitioning to operating in a second state in which at least: the access terminal requests a forward-link data rate from the base station by
(i) measuring the SNR of the forward link from the base station,
(ii) if the measured SNR is greater than the previously-measured SNR of the forward link, determining an SNR-up forward-link data rate selected from a first tabulation of forward-link data-rate values each associated with a respective SNR threshold value of the first tabulation, and transmitting a request to the base station to receive data on the forward link at the determined SNR-up forward-link data rate,
and (iii) if the measured SNR is less than the previously-measured SNR, determining an SNR-down forward-link data rate selected from a second tabulation of forward-link data-rate values each associated with a respective SNR threshold value of the second tabulation, and transmitting a request to the base station to receive data on the forward link at the determined SNR-down forward-link data rate,
wherein the first and second tabulations are different.

8. The method of claim 7, wherein the access terminal is further configured to operate according to a CDMA family of protocols including at least IS-856,
wherein the SNR of the forward link from the base station is a Signal to Interference plus Noise (SINR) of the forward link from the base station,
wherein the first tabulation of forward-link data-rate values each associated with a respective SNR threshold value of the first tabulation comprises a first tabulation of SINR threshold values against corresponding Data Rate Control (DRC) values,
wherein the second tabulation of forward-link data-rate values each associated with a respective SNR threshold value of the second tabulation comprises a second tabulation of SINR threshold values against corresponding DRC values,
wherein transmitting the request to the base station to receive data on the forward link at the determined SNR-up forward-link data rate comprises a transmitting an indication of the SNR-up forward-link data rate in a DRC message to the base station,
and wherein transmitting the request to the base station to receive data on the forward link at the determined SNR-down forward-link data rate comprises a transmitting an indication of the SNR-down forward-link data rate in a DRC message to the base station.

9. The method of claim 7, further comprising:
while operating in the second state, determining that the measured SNR is equal to the previously-measured SNR of the forward link, and responsively transmitting a request to the base station to receive data on the forward link at a current forward-link data rate that was previously set based on the previously-measured SNR.

10. The method of claim 7, wherein determining the SNR-up forward-link data rate further comprises updating the previously-measured SNR of the forward link with the measured SNR and updating a previously-determined forward-link data rate with the determined SNR-up forward-link data rate,
and wherein determining the SNR-down forward-link data rate further comprises updating the previously-measured SNR of the forward link with the measured SNR and updating the previously-determined forward-link data rate with the determined SNR-down forward-link data rate.

11. The method of claim 7, wherein the first tabulation comprises a first list of first SNR threshold values, each being mutually associated with a respective forward-link data-rate value in a corresponding list of forward-link data-rate values,
wherein determining the SNR-up forward-link data rate comprises (i) determining a smallest first SNR threshold value in the first list that is greater than the measured SNR, (ii) making a first determination of the respective forward-link data-rate value mutually associated with the determined smallest first SNR threshold value, (iii) if the first determined respective forward-link data-rate value is not less than a current forward-link data rate that was previously set based on the previously-measured SNR, setting the SNR-up forward-link data rate to the first determined respective forward-link data-rate value, and (iv) if the first determined respective forward-link data-rate value is less than the current forward-link data rate, setting the SNR-up forward-link data rate to the current forward-link data rate,
wherein the second tabulation comprises a second list of second SNR threshold values, each being mutually associated with a respective forward-link data-rate value in the corresponding list of forward-link data-rate values,
wherein determining the SNR-down forward-link data rate comprises (i) determining a smallest second SNR threshold value in the second list that is greater than the measured SNR, (ii) making a second determination of the respective forward-link data-rate value mutually associated with the determined smallest second SNR threshold value, (iii) if the second determined respective forward-link data-rate value is not greater than the current forward-link data rate, setting the SNR-down forward-link data rate to the second determined respective forward-link data-rate value, and (iv) if the second determined respective forward-link data-rate value is greater than the current forward-link data rate, setting the SNR-down forward-link data rate to the current forward-link data rate,
and wherein for each non-zero forward-link data-rate value in the corresponding list, the mutually associated first SNR threshold value in the first list is greater than the mutually associated second SNR threshold value in the second list.

12. The method of claim 11, wherein the access terminal is further configured to operate according to a CDMA family of protocols including at least IS-856,
wherein the SNR of the forward link from the base station is a Signal to Interference plus Noise (SINR) of the forward link from the base station,
wherein the first list of first SNR threshold values comprises a first list of SINR threshold values, and the second list of second SNR threshold values comprises a second list of SINR threshold values,
and wherein the corresponding list comprises a list of Data Rate Control (DRC) codes indicative of the forward-link data-rates.

13. The method of claim 7, wherein the access terminal is further configured to operate according to a CDMA family of protocols including at least IS-856,
and wherein receiving the high slot-utilization message from the base station comprises receiving an indication from the base station that the base station has greater than a threshold number of forward-link data packets to transmit in forward-link time slots.

14. The method of claim 7, further comprising:
while operating in the second state, receiving a low slot-utilization message from the base station; and
in response to receiving the low slot-utilization message, transitioning to operating in the first state.

15. The method of claim 7, further comprising:
while operating in the second state, making an error-rate determination that a packet error rate of data packets received on the forward link from the base station exceeds a threshold rate; and
in response to making the error-rate determination, transitioning to operating in the first state.

16. In a base station configured to operate as part of a wireless communication system, a method comprising:
at the base station, making a first determination that greater than a threshold number of data packets are to be transmitted during upcoming forward-link time slots to one or more access terminals engaged in respective active communication sessions with the base station; and
in response to the first determination, transmitting to the one or more access terminals a high slot-utilization message instructing each respective access terminal of the one or more access terminals to determine respective requested forward-link data rates selected from (i) a first tabulation of forward-link data-rate values each associated with a respective forward-link Signal-to-Noise (SNR) threshold value of the first tabulation if the respective access terminal detects increasing SNR of the forward link, and (ii) a second tabulation of forward-link data-rate values each associated with a respective forward-link SNR threshold value of the second tabulation if the respective access terminal detects decreasing SNR of the forward link,
wherein the first and second tabulations are different.

17. The method of claim 16, further comprising:
at the base station, making a second determination that less than a threshold number of data packets are to be transmitted during upcoming forward-link time slots to one or more access terminals engaged in respective active communication sessions with the base station; and
in response to the second determination, transmitting to the one or more access terminals a low slot-utilization message instructing each respective access terminal of the one or more access terminals to determine respective requested forward-link data rates selected from a single tabulation of forward-link data-rate values each associated with a respective forward-link SNR threshold value of the single tabulation, regardless of whether the respective access terminal detects increasing or decreasing SNR of the forward link.

18. The method of claim 16, wherein the method further comprises:
receiving respective requests from the one or more access terminals for respective data transmission rates on respective forward links from the base station.

19. The method of claim 18, wherein the base station is further configured to operated according to a CDMA family of protocols including at least IS-856,
wherein the first tabulation of forward-link data-rate values each associated with a respective forward-link SNR threshold value of the first tabulation comprises a first tabulation of a Signal to Interference plus Noise (SINR) of the forward link from the base station against corresponding Data Rate Control (DRC) values,
wherein the second tabulation of forward-link data-rate values each associated with a respective forward-link SNR threshold value of the second tabulation comprises a second tabulation of a SINR of the forward link from the base station against corresponding DRC values,
and wherein receiving respective requests from the one or more access terminals for respective data transmission rates on respective forward links from the base station comprises receiving respective DRC messages from the one or more access terminals.

20. An access terminal configured to operate in a wireless communication system that includes a base station, the access terminal comprising:
one or more processors;
memory accessible by the one or more processors; and
machine-language instructions stored in the memory that when executed by the one or more processors cause the access terminal to carry out functions including:
determining an initial forward-link data rate based on an initial signal-to-noise ratio (SNR) measurement of a forward link from the base station, wherein the initial SNR measurement is made by the access terminal at an initial time,
determining an updated SNR measurement of the forward link from the base station subsequent to the initial time,
upon determining that the updated SNR measurement is greater than the initial SNR measurement, making a determination of a first updated forward-link data rate selected from a first tabulation of forward-link data-rate values each associated with a respective SNR threshold value of the first tabulation, and transmitting a request to the base station to receive data on the forward link at the determined first updated forward-link data rate, and
upon determining that the updated SNR measurement is less than the initial SNR measurement, making a determination of a second updated forward-link data rate selected from a second tabulation of forward-link data-rate values each associated with a respective SNR threshold value of the second tabulation, and transmitting a request to the base station to receive data on the forward link at the determined second updated forward-link data rate,
wherein the first and second tabulations are different.

21. The access terminal of claim 20, wherein the functions further include:
upon a determination that the updated SNR measurement is equal to the initial SNR measurement, transmitting a request to the base station to receive data on the forward link at the initial forward-link data rate.

22. The access terminal of claim 20, wherein making the determination of the first updated forward-link data further comprises replacing the initial SNR measurement with the updated SNR measurement and replacing the initial forward-link data rate with the determined first updated forward-link data rate,
and wherein making the determination of the second updated forward-link data further comprises replacing the initial SNR measurement with the updated SNR measurement and replacing the initial forward-link data rate with the determined second updated forward-link data rate.

23. The access terminal of claim 20, wherein the first tabulation comprises a first list of first SNR threshold values, each being mutually associated with a respective forward-link data-rate value in a corresponding list of forward-link data-rate values,
wherein making the determination of the first updated forward-link data rate comprises (i) determining a smallest first SNR threshold value in the first list that is greater than the updated SNR measurement, (ii) making a first determination of the respective forward-link data-rate value mutually associated with the determined smallest first SNR threshold value, (iii) if the first determined respective forward-link data-rate value is not less than the initial forward-link data rate, setting the first updated forward-link data rate to the first determined respective forward-link data-rate value, and (iv) if the first determined respective forward-link data-rate value is less than the initial forward-link data rate, setting the first updated forward-link data rate to the initial forward-link data rate,
wherein the second tabulation comprises a second list of second SNR threshold values, each being mutually associated with a respective forward-link data-rate value in the corresponding list of forward-link data-rate values,
wherein making the determination of the second updated forward-link data rate comprises (i) determining a smallest second SNR threshold value in the second list that is greater than the updated SNR measurement, (ii) making a second determination of the respective forward-link data-rate value mutually associated with the determined smallest second SNR threshold value, (iii) if the second determined respective forward-link data-rate value is not greater than the initial forward-link data rate, setting the second updated forward-link data rate to the second determined respective forward-link data-rate value, and (iv) if the second determined respective forward-link data-rate value is greater than the initial forward-link data rate, setting the second updated forward-link data rate to the initial forward-link data rate,
and wherein for each non-zero forward-link data-rate value in the corresponding list, the mutually associated first SNR threshold value in the first list is greater than the mutually associated second SNR threshold value in the second list.

24. The access terminal of claim 23, wherein the access terminal is further configured to operate according to a CDMA family of protocols including at least IS-856,
wherein the initial SNR measurement of the forward link from the base station is an initial measurement by the access terminal of Signal to Interference plus Noise (SINR) of the forward link from the base station,
wherein determining the updated SNR measurement of the forward link from the base station comprises making an updated measurement of SINR of the forward link from the base station,
wherein the first list of first SNR threshold values comprises a first list of SINR threshold values, and the second list of second SNR threshold values comprises a second list of SINR threshold values, wherein the corresponding list comprises a list of Data Rate Control (DRC) codes indicative of the forward-link data-rates, wherein transmitting the request to the base station to receive data on the forward link at the determined first updated forward-link data rate comprises transmitting an indication of the determined first updated forward-link data rate in a DRC message to the base station, and wherein transmitting the request to the base station to receive data on the forward link at the determined second updated forward-link data rate comprises transmitting an indication of the determined second updated forward-link data rate in a DRC message to the base station.

25. The access terminal of claim 20, wherein the functions further include:

receiving a high slot-utilization message from the base station;

responding to receiving the high slot-utilization message by determining whether the updated SNR measurement is greater than or less than the initial SNR measurement and respectively making either the determination of the first updated forward-link data rate or the determination of the second updated forward-link data rate;

receiving a low slot-utilization message from the base station;

responding to receiving the low slot-utilization message by using a single tabulation of SNR threshold values against corresponding forward-link data-rate values, regardless of whether the updated SNR measurement is greater than or less than the initial SNR measurement, to make a third determination of an updated forward-link data rate; and transmitting a request to the base station to receive data on the forward link at the third determined updated forward-link data rate.

* * * * *